United States Patent
Li et al.

(10) Patent No.: US 11,640,698 B2
(45) Date of Patent: May 2, 2023

(54) MAPPING PHYSICAL LOCATIONS TO FIT VIRTUALIZED AR AND VR ENVIRONMENTS

(71) Applicant: International Business Machines Corporation, Armonk, NY (US)

(72) Inventors: Caroline Li, Johns Creek, GA (US); Jacob Greenleaf, Lexington, NC (US); Nimra Tariq, Leesburg, VA (US); Zachary A. Silverstein, Austin, TX (US); Clement Decrop, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/331,820

(22) Filed: May 27, 2021

(65) Prior Publication Data
US 2022/0383594 A1    Dec. 1, 2022

(51) Int. Cl.
*G06T 19/00* (2011.01)
*G06T 7/11* (2017.01)
(Continued)

(52) U.S. Cl.
CPC .............. *G06T 19/006* (2013.01); *G06T 7/11* (2017.01); *G06T 19/20* (2013.01); *G06V 10/25* (2022.01);
(Continued)

(58) Field of Classification Search
CPC ......... G06T 19/006; G06T 7/11; G06T 19/20; G06T 2207/20084; G06T 7/70;
(Continued)

(56) References Cited

U.S. PATENT DOCUMENTS 9,892,562 B2 *   2/2018   Steed ................... G06T 19/006
10,403,043 B2    9/2019   Kaufman
(Continued)

FOREIGN PATENT DOCUMENTS

CN    103460256 B    9/2016

OTHER PUBLICATIONS

"3D scanning, mixed reality and more, for any device from iPads to robots", Structure by Occipital, 7 pages, <https://structure.io/>, downloaded from the Internet on Apr. 22, 2021.
(Continued)

*Primary Examiner* — Xilin Guo
(74) *Attorney, Agent, or Firm* — Christopher M. Pignato

(57) ABSTRACT

Systems, methods, and computer programming products for generating, rendering and/or displaying a computer-generated virtual environment as augmented reality and/or virtual reality. The physical boundaries containing the active area where the virtual environments are rendered and displayed are established. Based on the constraints and characteristics of the physical boundaries, virtual environments are mapped using assets from real, historical and/or fictitious locations. The assets can be dynamically re-sized and distanced to fit constraints of the physical space. Based on historical levels of interactivity with the selected environments, the virtual assets can be sorted and tagged as points of interest or filler assets, then mapped to the virtual environment using GAN technology and other machine learning techniques to re-create unique versions of the selected environments. Virtual thresholds can be introduced to segment the virtual environment into multiple portions and reduce the amount of assets needing to be simultaneously displayed.

20 Claims, 13 Drawing Sheets

(51) Int. Cl.
G06T 19/20 (2011.01)
G06V 10/25 (2022.01)
G06V 20/00 (2022.01)
(52) U.S. Cl.
CPC .... G06V 20/35 (2022.01); *G06T 2207/20084* (2013.01)
(58) Field of Classification Search
CPC ......... G06T 19/00; G06T 17/00; G06V 10/25; G06V 20/35; G06V 20/20; G06V 10/764
See application file for complete search history.

(56) References Cited

U.S. PATENT DOCUMENTS

| | | | | |
|---|---|---|---|---|
| 11,010,982 | B1* | 5/2021 | Guerra Filho | G06T 19/20 |
| 11,210,863 | B1* | 12/2021 | Yan | G06T 19/20 |
| 2016/0253842 | A1 | 9/2016 | Shapira | |
| 2018/0365897 | A1* | 12/2018 | Pahud | G06F 3/012 |
| 2019/0051051 | A1 | 2/2019 | Kaufman | |
| 2019/0147220 | A1 | 5/2019 | Mccormac | |
| 2020/0005540 | A1* | 1/2020 | Challagolla | G06T 19/20 |

OTHER PUBLICATIONS

"AR/VR meets enterprise", IBM Design Language, retrieved from the Wayback Machine Internet Archive, Apr. 23, 2019, 2 pages, <https://web.archive.org/web/20190423232651/https://www.ibm.com/design/v1/language/experience/vrar/>.

"IBM and Smithsonian Open the National Museum of African American History and Culture—Virtually", Armonk, NY and Washington, DC—Sep. 26, 2007, 3 pages, https://www-03.IBM.com/press/us/en/pressrelease/22379.wss>.

"IBM Hursley Museum", downloaded from the Internet on Apr. 22, 2021, 2 pages, <https://slx-online.biz/hursley/the_museum.asp>.

"IBM Museum of Endicott", Tripadvisor, downloaded from the Internet on Apr. 22, 2021, 7 pages, <https://www.tripadvisor.com/Attraction_Review-g47686-d6784856-Reviews-IBM_Museum_of_Endicott-Endicott_New_York.html>.

"Paint with Neurons", IBM Research, downloaded from the Internet on Apr. 22, 2021, 5 pages, <https://gan-paint-demo.mybluemix.net/>.

"Virtual reality for all creative minds", OpenSpace3D, downloaded from the Internet on Apr. 22, 2021, 5 pages, <https://www.openspace3d.com/>.

Cheng et al., "VRoamer: Generating On-The-Fly VR Experiences While Walking Inside Large, Unknown Real-World Building Environments", 2019 IEEE Conference on Virtual Reality and 3D User Interfaces (VR), Mar. 23-27, Osaka, Japan, pp. 359-366.

Gebhart, Andrew, "Facial recognition: Apple, Amazon, Google and the race for your face", cnet, Mar. 18, 2019, 14 pages, <https://www.cnet.com/home/smart-home/facial-recognition-apple-amazon-google-and-the-race-for-your-face-facebook/>.

Kanamori et al., "Obstacle Avoidance Method in Real Space for Virtual Reality Immersion", 2018 IEEE International Symposium on Mixed and Augmented Reality (ISMAR), 11 pages, DOI: 10.1109/ISMAR.2018.00033.

Marwecki et al., "Scenograph: Fitting Real-Walking VR Experiences into Various Tracking Volumes", UIST 2018, Session 10: Navigation, Oct. 14-17, 2018, Berlin, Germany, pp. 511-520, https://doi.org/10.1145/3242587.3242648.

Marwecki et al., "VirtualSpace—Overloading Physical Space with Multiple Virtual Reality Users", CHI 2018, Paper 241, Apr. 21-26, 2018, Montreal, QC, Canada, pp. 1-10, https://doi.org/10.1145/3173574.3173815.

Mell et al., "The NIST Definition of Cloud Computing", Recommendations of the National Institute of Standards and Technology, Special Publication 800-145, Sep. 2011, 7 pages.

Sing et al., "Garden: A Mixed Reality Experience Combining Virtual Reality and 3D Reconstruction," CHI'16 Extended Abstracts, May 7-12, 2016, San Jose, CA, USA, pp. 180-183, http://dx.doi.org/10.1145/2851581.2890370.

Sra et al., "Procedurally Generated Virtual Reality from 3D Reconstructed Physical Space", In Proceedings of the 22nd ACM Conference on Virtual Reality Software and Technology, VRST '16,, Nov. 2-4, 2016, Garching bei Munchen, Germany, pp. 191-200, DOI: http://dx.doi.org/10.1145/2993369.2993372.

Vasylevska et al., "Flexible Spaces: Dynamic Layout Generation for Infinite Walking in Virtual Environments", 2013 IEEE Symposium on 3D User Interfaces (3DUI), Mar. 16-17, Orlando, FL, USA, pp. 39-42.

Wilson, Mark, "In the home of the future, every surface is an interface", Fast Company, Jan. 22, 2020, 4 pages, <https://www.fastcompany.com/90453867/in-the-home-of-the-future-every-surface-is-an-interface>.

* cited by examiner

MAPPING PHYSICAL LOCATIONS TO FIT VIRTUALIZED AR AND VR ENVIRONMENTS

TECHNICAL FIELD

The present disclosure relates generally to the field of augmented reality or virtual reality and more particularly to mapping virtual environments to fit within the confines and constraints of physical location boundaries.

BACKGROUND

Augmented reality (AR) is a system that enhances the real world by superimposing computer-generated information over top of the real world, allowing for the computer-generated information being overlaid onto the real world, to be viewable through an AR device or computing devices capable of displaying augmented reality. In contrast with augmented reality, virtual reality (VR) differs from the AR experience because VR is directed toward technology that creates a purely synthesized, computer-generated environment, rather than an environment that is simply enhanced with overlapping real world and computer-generated graphics. In other words, AR environments combine a mixture of the surrounding physical environment of the real world with the computerized information, whereas VR systems completely immerse the user inside the synthetic, virtual environment, wherein the user does not see physical objects of real world around them while engaging with the virtual environment.

Generative Adversarial Networks (GAN) is a class of machine learning framework that uses two neural networks to create a two-part artificial intelligence (AI) model comprising a "generator" and a "discriminator". The generator creates synthetic examples from random noise using a distribution. The synthetic examples being generated are outputted, along with real examples from training data to the discriminator. The discriminator attempts to differentiate between the synthetic samples and real-world samples. Both generators and discriminators improve upon their respective abilities to generate or differentiate until the discriminator is unable to tell the difference between the real example and synthesized examples with more than 50% accuracy. GAN's train using unsupervised learning, which means that training is performed without reference to known, labeled or annotated training data. The correct identification of synthetic examples by the discriminator improves the generator. Every time the discriminator correctly identifies the synthetic example, the discriminator tells the generator how to tweak the output of the generator to make future synthetic examples more realistic and thus harder to differentiate.

SUMMARY

Embodiments of the present disclosure relate to a computer-implemented method, an associated computer system and computer program products for mapping real world physical locations to virtualized environments capable of being explored using augmented reality (AR) and/or virtual reality (VR), merging physical boundaries of the real world with key focus points of the virtual environment being mapped and additional virtual assets. The computer-implemented method comprises the steps of selecting, by a processor, a virtual space from a selection of real, historical or fictitious locations; defining, by the processor, physical boundaries of an active area in real world space configured to contain the computer-generated virtual environment; extracting, by the processor, virtual assets depicting the virtual space from one or more data sources; classifying, by the processor, the virtual assets into point of interest (POI) assets and filler assets; mapping, by the processor, the POI assets to the computer-generated virtual environment, within the physical boundaries of the active area in accordance, wherein placement of the POI assets within the active are optimized based on the size constraints imposed by the physical boundaries and characteristics of the active area; and further mapping, by the processor, a remaining portion of the active area with the filler assets using a generative adversarial network (GAN) based on relative distance between POI assets in the virtual space selected from the real, historical or fictitious locations.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
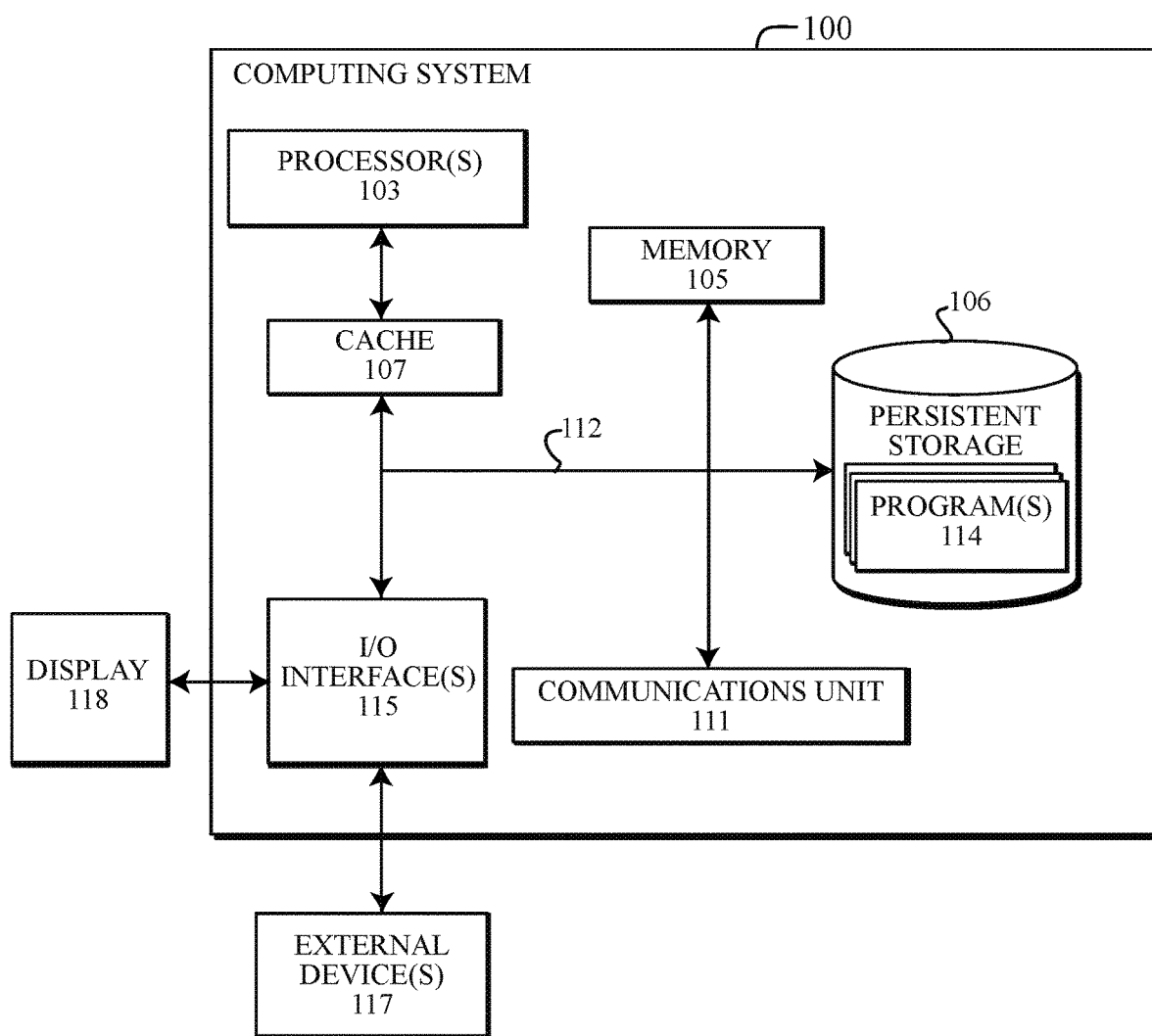
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

The operation of AR and VR systems configured to display computer-generated virtual environments within a confined physical space can be cumbersome and/or impractical, depending on the size of the physical location and/or scope of the virtual environments being rendered, as well as the limitations presented by the available physical space. Often, size limitations of the surrounding physical space can limit the effectiveness and enjoyability of the virtual assets being inserted into the AR environment and/or the user's ability to move and interact with virtual assets within a VR environment. Embodiments of the present disclosure recognize the limitations of rendering either AR and/or VR environments (referred to together generally as "virtual environments") within limited real-world space. The present disclosure alleviates these limitations by taking into account and/or integrating existing physical boundaries and barriers present within the real world when mapping a virtual environment. The existing physical boundaries and/or barriers can be integrated with virtual assets, and key focus points within the virtual environment can be prioritized to seamlessly re-map digital representations of selected real-world, historical or fictitious locations within a virtual environment to help reduce restrictive space limitations impacting placement of the virtual assets within the virtual environment.

Embodiments of the present disclosure leverage the use of GAN technology to optimize placement and scale of virtual assets within the confines of the available physical space, prioritize the virtual asset placement based on classification as an asset that is a point of interest or key focal point, or a filler asset of the selected locations being re-created in the virtual environment. Moreover, embodiments can dynamically alter distances and sizes of assets to accommodate for the available physical space and utilize existing physical objects and/or barriers of the real world during the mapping process to establish logical separation points between segments or portions of the virtual environment based on the layout of the physical space. In some embodiments of the present disclosure, a user may opt-in to the use of a virtualized location module capable of rendering AR or VR versions of real-world physical or historical locations, in a virtual environment. The locations selected by the user may be locations previously visited by users and stored as part of a historical corpus of user-visited locations. The historical corpus may include the storage of preferences about the spaces the user has visited and interactivity data describing how users interact with the real or historical environments.

Users may initiate the mapping process of a physical location to a virtual environment by mapping the boundaries of the physical space being used to contain the local rendering of a selected location, that may be based on a real-world, historical or fictitious location. For example, by walking along the boundaries of the area being set up or using an imaging device to establish the user's physical location. Boundaries may be automatically generated based on the user's walkthrough of the physical location or images thereof using a convolutional neural network (CNN) image classifier. The image classifier can identify objects and physical structures such as doors, walls, windows, archways, furniture, other objects, etc., positioned within the physical location. Virtual assets of the selected location being mapped to the virtual environment may be extracted from one or more data sources comprising the assets and may be classified as key points of interest assets and/or filler assets. Embodiments of the present disclosure may use GAN technology and information stored by a historical corpus about user preferences and behaviors within visited locations in the real world to map virtual assets within the space of the physical boundaries. Virtual assets can be mapped around existing obstacles within the physical space and/or virtual assets can be integrated into existing real-world obstacles as part of the virtual environment. Embodiments may iteratively design multiple different layouts comprising a plurality of virtual assets and score the layouts to quantify whether a constructed layout is an optimal layout for the combination of the selected location, the virtual assets and the physical space. Virtual assets placed within the virtual environment can be dynamically resized from the original size and distanced according to scale, to fill the virtual environment more naturally within the confines of the physical space that has been mapped out or to more accurately mimic the selected location using at a scale appropriate to fit the physical location hosting the virtual environment being displayed.

Moreover, in situations where the selected location being mapped to the physical space requires additional space to be effectively mapped as a virtual environment, and/or physical barriers exist that separate portions of the usable physical space for mapping the virtual environment, portions of the virtual environment may integrate the physical barriers into the virtual environment as a way of separating different areas of the virtual environment. For example, real doors present in the physical space may be used as a reference point to place a virtual door, gateway or portal within the virtual environment. Performing an action of opening the real door in the physical space translates opening the virtual door.

Upon opening the virtual door, a new portion of the virtual environment may be rendered and displayed to the user. Furthermore, the virtual doors acting as segmentation points for loading additional portions of the virtual environment may act as a gateways or portals to more than one selectable area of the virtual environment. For instance, context specific actions performed by the user may indicate which portion of the virtual environment will be rendered once the virtual and/or real door is opened. For example, by opening the door in a specific manner, or entering a multi-digit code on a virtual keypad within the virtual environment, followed by opening the door, may dictate to which portion of the virtual environment is rendered and displayed to the user.

Computing System

FIG. 1 illustrates a block diagram of an embodiment of a computing system 100, which may be a simplified example of a computing device (i.e., a physical bare metal system or virtual system) capable of performing the computing operations described herein for mapping, rendering, and displaying a virtual environment within the boundaries of a physical location. Computing system 100 may be representative of the one or more computing systems or devices implemented as part of computing environments depicted in FIGS. 2-7C, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), augmented reality-enabled devices, virtual reality headsets, multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Mapping and Displaying Virtual Environments

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Referring to the drawings, FIG. 2 to FIG. 7C depict an approach that can be executed using one or more computing systems 100 operating within a computing environment 200, 300, 400 and variations thereof, to implement systems, methods, and computer program products for mapping, rendering and displaying real, historical or fictitious locations using virtual assets 225 thereof, to optimize the virtual environment based on the characteristics and/or constraints of the physical space available to the user. Embodiments of computing environments 200, 300, 400 may include one or more computing systems 100 interconnected via a computer network 250. The computing systems 100 connected to the computing network 250 may be specialized systems or devices that may include, but are not limited to, the interconnection of one or more augmented reality device 201 (hereinafter "AR device 201"), virtual reality device 203 (hereinafter "VR device 203"), a generative adversarial network (GAN) 229, and/or one or more host systems, servers or data centers maintaining one or more asset repository 223 and/or physical location data source(s) 227.

Embodiments of an AR device 201 may be any computing system 100 capable of viewing and displaying computer-enhanced versions of a user's real-world surroundings. For example, by digitally capturing physical environments using an imaging device 205a and inserting virtual assets 225 by overlaying graphical images onto digital representations of real-world environments being captured and displayed by the AR device 201. AR devices 201 may be equipped with one or more imaging device 205a, such as a camera system and sensor devices 207a tracking user movement and user position within the physical space. In contrast to an AR device 201, VR device 203 may render and/or display a computer-generated simulation of a three-dimensional images or environments that a user can interact with in a seemingly real or physical manner. Embodiments of a VR device 203 may include headsets, goggles, or other display devices configured to display the computer-generated environments and virtual assets. Some VR devices 203, may enclose around a user's face or head and obstruct a user from viewing the physical world around the user, immersing the user entirely within the computer-generated virtual world.

VR devices 203 may further comprise controllers, imaging devices 205b, or other input devices that may be equipped with one or more sensor devices 207b, that may allow a user to traverse the computer-generated environment and interact with the digital objects presented therein. In some instances, imaging devices 205b may track the user's position relative to the physical boundary of the active area within which the user is experiencing the virtual environment. As the user moves closer to the boundary or encroaches on said boundary and/or real-world objects within the active area, the imaging device 205 may reveal portions of the physical world within the virtual environment to help guide the user and assist the user in returning to a safe location within the active area established by the physical boundaries. Examples of AR devices 201 and VR devices 203 may include, but are not limited to mobile communications devices such as cell phones or smart phones, tablet computers, laptops, desktop computers, smart glasses, headsets, helmets, goggles, lenses, projectors, heads up displays, etc. In some instances, a single device may operate as either an AR device 201 and/or VR device 203. The combined AR/VR device may be capable of operating in both AR mode or a VR mode and may freely switch between to the two modes of operation.

Embodiments of the specialized computing systems or devices exemplified in FIGS. 2-7C may not only comprise the elements of the systems and devices depicted in the drawings of FIGS. 2-7C, but the specialized computing systems depicted in FIGS. 2-7C may further incorporate one or more elements of computing system 100 shown in FIG. 1 and described above. Although not shown in the Figures, one or more elements of computing system 100 may be integrated into the embodiments of AR device 201, VR device 203, GAN 229, the one or more systems, servers, and/or devices hosting or maintaining asset repository 223 and physical location data source(s) 227, including (but not limited to) the integration of one or more processor(s) 103, program(s) 114, memory 105, persistent storage 106, cache 107, communications unit 111, I/O interface(s) 115, external device(s) 117 and human-readable display 118.

Embodiments of the AR device 201, VR device 203, GAN 229, the one or more systems, servers, and/or devices hosting or maintaining asset repository 223 and physical location data source(s) 227, may be placed into communication with one another via a computer network 250. Embodiments of network 250 may be constructed using wired, wireless or fiber-optic connections. Embodiments of the AR device 201, VR device 203, GAN 229, the one or more systems, servers, and/or devices hosting or maintaining asset repository 223 and physical location data source(s) 227 may connect and communicate over the network 250 via a communications unit 111, such as a network interface controller, network interface card, network transmitter/receiver or other network communication device capable of facilitating communication across network 250. In some embodiments of computing environments 200, 300, 400, one or more AR device 201, VR device 203, GAN 229, systems, servers, and/or devices hosting or maintaining asset repository 223 and physical location data source(s) 227, may represent computing systems 100 utilizing clustered computers and components acting as a single pool of seamless resources when accessed through network 250. For example, such embodiments can be used in a datacenter, cloud computing network, storage area network (SAN), and network-attached storage (NAS) applications.

Embodiments of the communications unit 111 such as the network transmitter/receiver may implement specialized electronic circuitry, allowing for communication using a specific physical layer and a data link layer standard. For example, Ethernet, Fiber channel, Wi-Fi or other wireless radio transmission signals, cellular transmissions or Token Ring to transmit data between AR device 201, VR device 203, GAN 229, the one or more systems, servers, and/or devices hosting or maintaining asset repository 223 and physical location data source(s) 227 connected to network 250. Communications unit 111 may further allow for a full network protocol stack, enabling communication over network 250 to groups AR device 201, VR device 203, GAN 229, the one or more systems, servers, and/or devices hosting or maintaining asset repository 223 and physical location data source(s) 227 linked together through communication channels of network 250. Network 250 may facilitate communication and resource sharing among AR device 201, VR device 203, GAN 229, the one or more systems, servers, and/or devices hosting or maintaining asset repository 223 and physical location data source(s) 227 connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks, wireless communication networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
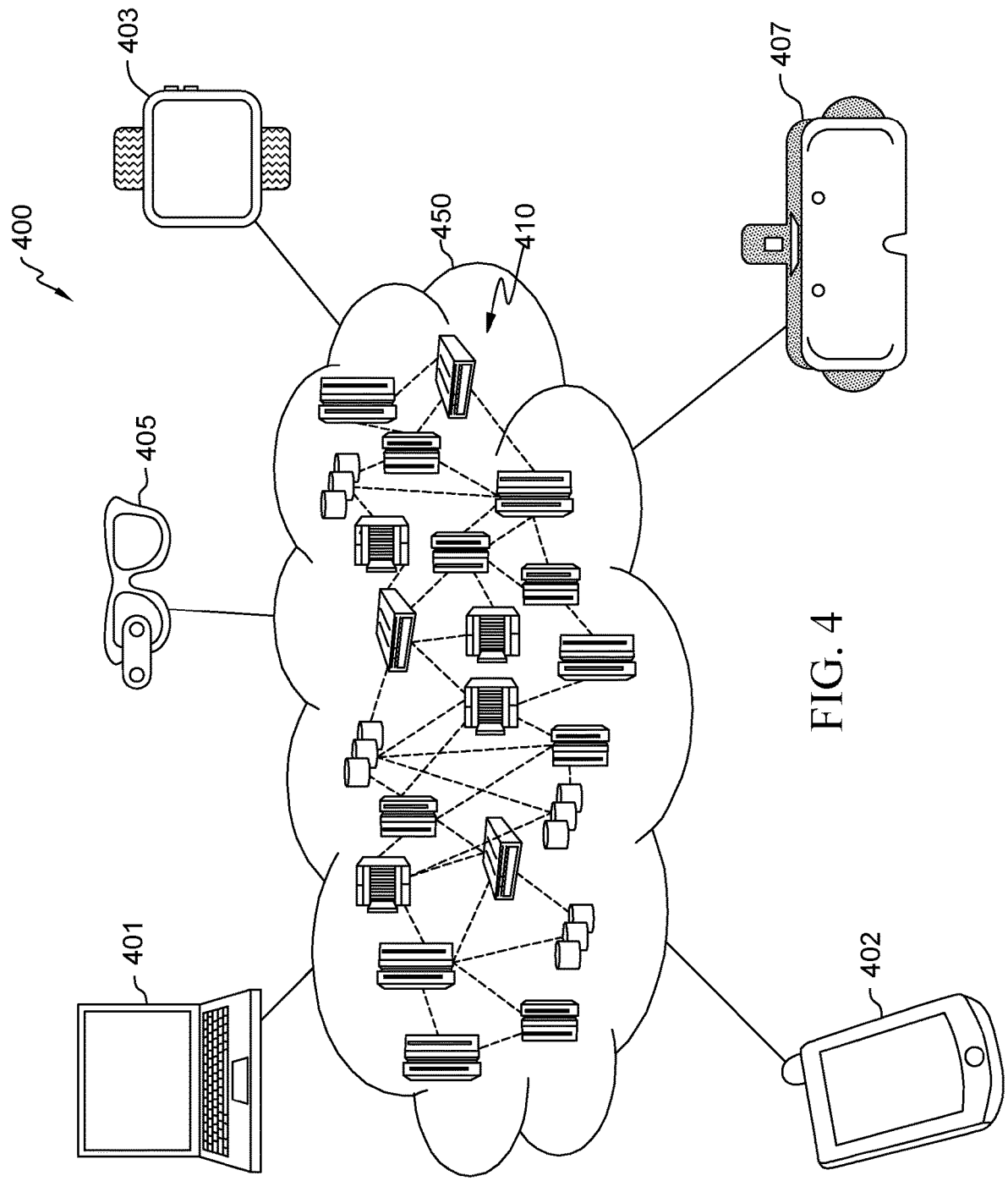
FIG. 4 depicts a block diagram illustrating a cloud computing environment in accordance with the present disclosure.

Referring to the drawings, FIG. 4 is an illustrative example of a cloud computing environment 400. As shown, cloud computing environment 400 includes one or more cloud computing nodes 410 with which end user devices may be used by cloud consumers, to access one or more software products, services, applications, and/or workloads provided by cloud service providers. Examples of the end user devices are depicted and may include devices such as a smartphone 402 or cellular telephone, desktop computers, laptop computer 401, smart devices such as smartwatch 403 and smart glasses 405, and VR headset 407. Nodes 410 may communicate with one another and may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of end user devices shown in FIG. 4 are intended to be illustrative only and that computing nodes 410 of cloud computing environment 400 can communicate with any type of computerized device over any type of network and/or network addressable connection (e.g., using a web browser).

Figure 5:
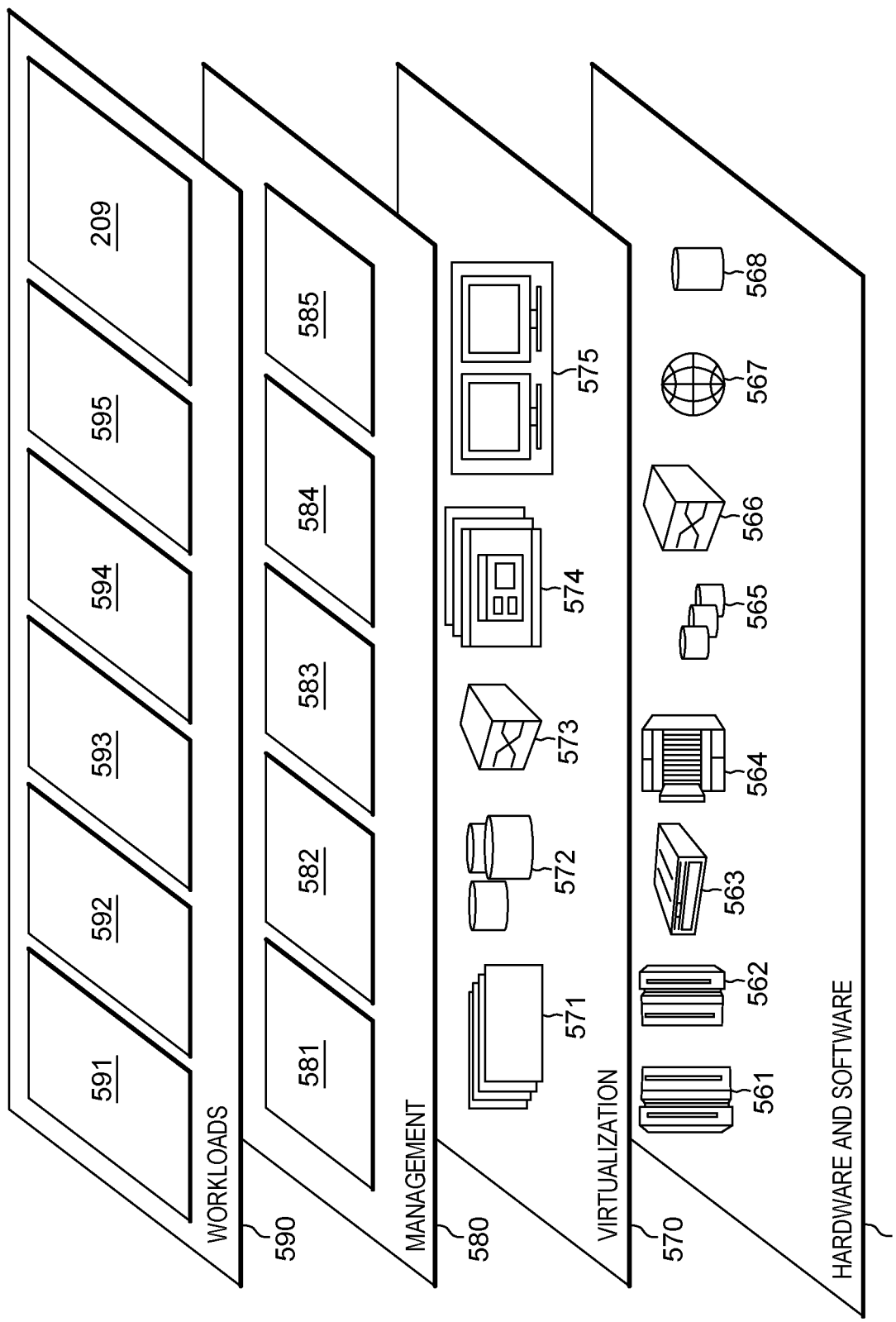
FIG. 5 depicts an embodiment of abstraction model layers of a cloud computing environment in accordance with the present disclosure.

Referring now to FIG. 5, a set of functional abstraction layers provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment 400. Metering and pricing 582 provide cost tracking as resources are utilized within the cloud computing environment 400, and billing or invoicing for consumption of these resources. In one example, these resources can include application software licenses. Security provides identity verification for cloud consumers and tasks, as well as protection for data and other resources. User portal 583 provides access to the cloud computing environment 400 for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include software development and lifecycle management 591, data analytics processing 592, virtual classroom education delivery 593, transaction processing 594; multi-cloud management 595 and virtualized location module 209.

Figure 2:
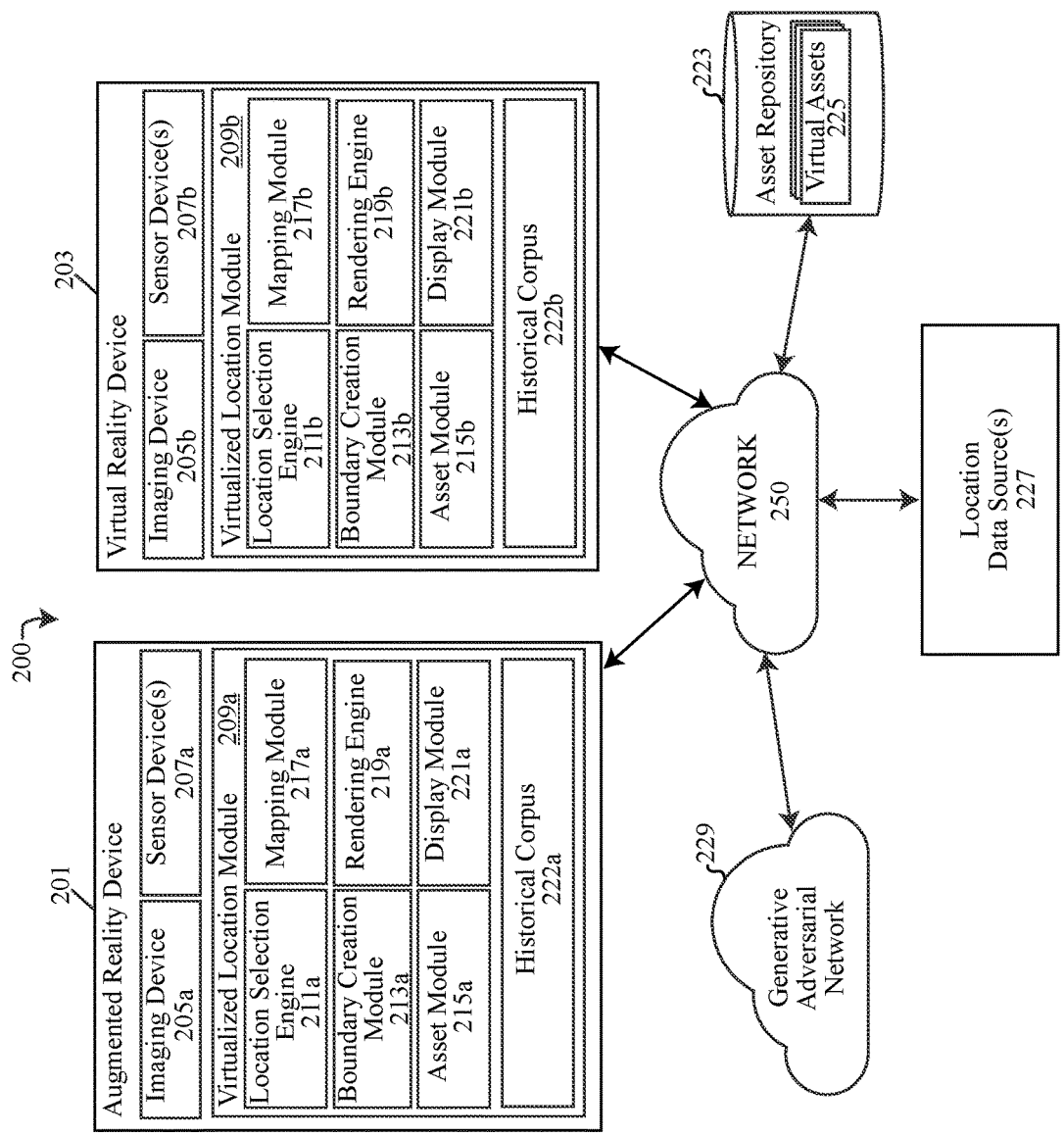
FIG. 2 depicts a functional block diagram describing an embodiment of a computing environment for mapping and displaying a virtual environment within the boundaries of a physical location in accordance with the present disclosure.

Referring to the drawings, FIG. 2 depicts an embodiment of a computing environment 200 capable of mapping, rendering and displaying real, historical or fictitious locations using virtual assets 225 thereof, as part of an AR or VR virtual environment optimized based on the characteristics of the physical space available for the user to interact with the virtual environment. Embodiments of the computing environment 200 may extract known points of interest from real world, historical or fictious locations as virtual assets 225, map the extracted virtual assets 225 to locations within a virtual environment, utilize GAN technology to overlay the virtual assets 225 at optimum positions within the virtual environments based on the characteristics and constraints of the physical space available and display the optimized arrangement of said virtual assets 225 of the virtual environment to an AR device 201 or VR device 203. Embodiments of the AR device 201 and VR device 203 may comprise hardware and/or software capable of generating, rendering and displaying the virtualized environments as an augmented reality and/or virtual reality experience for a user. Embodiments of the AR device 201 and VR device 203 may comprise one or more components or modules that may be tasked with implementing the functions, tasks or processes associated with selecting locations for rendering as a virtual environment; defining boundaries of the physical space for containing users experiencing the virtual environment; extracting virtual assets 225 from data sources associated with the selected location; classifying the extracted assets; mapping the digital assets to an optimized position within the virtual environment; and dynamically sizing and/or loading assets in portions based on the physical limitations and characteristics of the physical space available for the virtual environment.

The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200, 300, 400. For example, in FIG. 2, AR device 201 and/or VR device 203 may comprise one or more components and modules, including an imaging device 205a, 205b, sensor device 207a, 207b, and virtualized location module 209a, 209b (referred to hereon generally as "virtualized location module 209"). In some embodiments, the virtualized location module 209 may include sub-modules or sub-components performing one or more specialized tasks, processes or functions of the virtualized location module 209. For instance, in the exemplary embodiment depicted in FIG. 2, the virtualized location module 209 comprise a location selection engine 211a, 211b, boundary creation module 213a, 213b, asset module 215a, 215b, mapping module 217a, 217b, rendering engine 219a, 219b, display module 221a, 221b and historical corpus 222a, 222b.

Figure 6A:
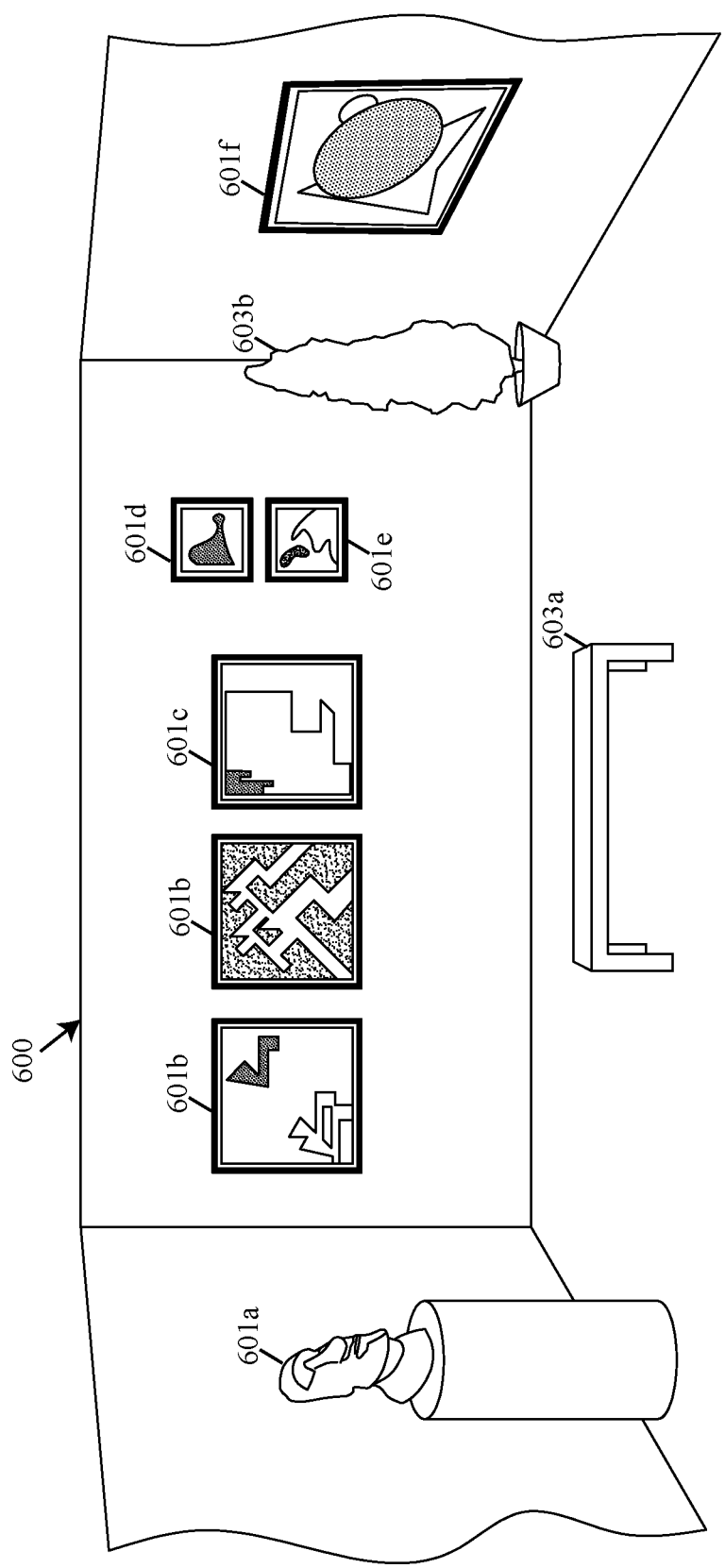
FIG. 6A illustrates an embodiment of a physical location available for selection to be mapped to a virtual environment in accordance with the present disclosure.

Embodiments of the location selection engine 211a, 211b (hereinafter referred to generally as location selection engine 211) may perform the functions, tasks, and processes of the virtualized location module 209 directed toward selecting a location to recreate and locally render by the AR device 201 or VR device 203, as a virtual environment. The location selection engine 211 may maintain a list of available locations a user may select, or in some embodiments, a user may input the desired location the user would like to select for re-creation within a virtual environment. In some instances, a user may select whether the location being selected is for viewing in an augmented reality, and/or a virtual reality environment. Embodiments of the locations maintained by the location selection engine 211 may be real, physical locations that currently exist; for example, famous tourist attractions, museums, monuments, landmarks, art galleries, etc. FIG. 6A provides an example of a portion of a physical location 600, available for selection by the location selection engine 211 to map to a virtual environment. As shown in FIG. 6A, the location 600 is an example of a portion of a museum comprising one or more real world objects 601*a*-601*f*, 603*a*-603*b* positioned within the location 600. each of the real-world objects 601*a*-601*f*, 603*a*-603*b* may be available for re-creation digitally as a virtual asset 225 for mapping to a virtual environment. Objects within the location 600 may include objects of interest 601*a*-601*f*, such as the artwork within the museum and filler objects 603*a*-603*b* such as the surrounding plants 603*b* and furniture 603*a*.

In some embodiments, the location selection engine 211 may offer historical locations that represent a particular physical location at a moment in time that was captured in the past. Moreover, in some embodiments, the location selection engine 211 may offer users fictitious locations, that were never part of the real world. For example, locations from literature, films and other works of fiction, which can be recreated and explored by the user in a three-dimensional environment using AR or VR technology. In some instances, the fictitious locations may be created by software developers or user-created locations that may be shared amongst a community of users. For example, sandbox area created by users or developers that may contain multiple real or fictitious objects or environments that are not within proximity to one another in the real world. For instance, a dynamically adjustable museum that includes displays for virtual representations of artwork compiled from museums all over the world that can be rendered in a non-real museum that allows a user to explore all the different works of art in a single virtual environment, rather than having to separately re-create each individual museum where the artwork could be found in the real world.

Embodiments of the location selection engine 211 may include a graphical user interface (GUI) that is able to accept input from the user during the location selection process. In some embodiments, users selecting a location may edit one or more features of the location being selected and/or select subsections of a location to render and display. For example, users can manually select one or more portions of a location to render and display, turn on or off the specific virtual assets 225 that will be mapped to virtual environment and/or introduce modifications to the layouts of the selected locations and/or manually rearrange the layout of the selected location.

In some embodiments, the location selection engine 211 may allow a user to select one or more real world locations to render and display to an AR device 201 or VR device 203, that a user has previously visited and/or interacted with. Embodiments of the location selection engine 211 may obtain information about real world locations a user has visited from a historical corpus 222*a*, 222*b* (referred to generally herein as historical corpus 222). Users may give permission to the virtualized location module 209 to create a historical corpus 222 and/or contribute user data to one or more historical corpuses that may be shared amongst a community of users. Embodiments of the historical corpus 222 may collect a user's preferences about the physical spaces surrounding the user, and the physical spaces a user has visited. The historical corpus may track how a user behaves or interacts with the surrounding environment of the physical spaces the user visits, and the historical corpus 222 may draw one or more conclusions about the user, the user's behavior and preferences. Data collected by the historical corpus 222 may be used by the virtualized location module 209 to influence, inform and/or automate one or more the processes and functions of the virtualized location module 209. Examples of the types of data a historical corpus 222 may collect may include (but is not limited to) a user's geo-location, network access data, visual tracking data such as directionality of user eye contact, image or video data collected by imaging devices 205*a*, 205*b*, sensor data collected by sensor devices 207*a*, 207*b*, and any other types of data that may be collected by computing systems generally, and/or an AR device 201 or VR device 203.

Embodiments of the boundary creation module 213*a*, 213*b* (referred to herein generally as boundary creation module 213) may perform the tasks, functions and processes of the virtualized location module 209 directed toward establishing and identifying physical boundaries of the active area occupied by the user during the user's experience of the virtual environment. Embodiments of the boundary creation module 213 can capture a physical mapping of three-dimensional space using the imaging devices 205 and/or sensor devices 207 of the AR device 201, VR device 203, or a standalone imaging and/or sensor system. The imaging device 205*a*, 205*b* of AR device 201 and/or VR device 203 may scan the physical surroundings of the active area and use object recognition to identify the physical boundaries as well as objects or other obstacles that may be present within the active area being established. From the images collected by the boundary creation module 213, the boundary creation module can create a first three-dimensional model representing the physical space (referred to herein as "PS1 model") of the active area selected for experiencing the virtual environment in an AR or VR mode. For example, during boundary setup, a user may initiate a setup mode using the AR device 201 or VR device 203, activating the image device 205 and onboard sensor devices 207 tracking the position of the AR or VR devices. The user may walk along the perimeter of the boundary to establish the perimeter of the active area. As the user walk along the boundaries, the boundary creation module 213 may track the position of the AR device 201 or VR device 203 position encircling the perimeter of the physical space being established as the active area. For example, by using positional sensors and location-based sensor devices to track the user's movement within the boundaries being established. In some embodiments, the boundaries of the active area may include a single room or a plurality of rooms, and may further comprise a plurality of walls, doors, thresholds, and accessible areas.

In some embodiments of the boundary creation module 213 used to setup boundaries for generating the three-dimensional PS1 model of the physical space containing the active area, may build the PS1 model by collecting images or video data of the physical space within the boundaries. Collected images and video data may be processed to classify objects within the physical space, including classifications of doors, walls, thresholds, and other specific objects that may be present such as furniture, counters, shelving, etc. For example, imaging devices 205 of the AR device 201 or VR device 203 may record the surrounding physical environment being established as the active area for implementing a virtual environment. The recorded image data may be inputted into a convolutional neural network (CNN) image classifier. The CNN image classifier can detect and classify the various objects within the recorded images, including the boundaries and established obstacles such as doors, walls, fences, etc. Embodiments CNN image classifier may output based on the classification of the objects and boundaries detected, one or more proposed boundary recommendations that a user may select for establishing an active area for experiencing augmented reality or virtual reality environment of the selected location.

In some embodiments, the boundary creation module 213 may recommend to the user a previously used set of boundaries based on historical preferences for a particular location that has already been examiner and established an active area by the user. For example, the boundaries established previously by the user and/or boundaries previously established based upon recommendations of the CNN image classifier. Such previously prepared models of an active area may be stored by the historical corpus 222. The boundary creation module 213 may access records of the historical corpus for the current location, and re-use the previously established physical boundaries, either automatically, or present a recommendation to use the historical boundaries. User's being presented previously established boundaries of an active area may accept the historical boundaries or establish a new set of physical boundaries for the active area to reside within. Embodiments of the boundary creation module 213 may identify historical boundaries using geo-location to recognize if a user is positioned within a particular area that has previously established physical boundaries, such as the user's home; or by analyzing a network 250 connected to the AR device 201 and/or VR device 203. In instances where the network 250 is recognized as a previously used network 250, the boundary creation module 213 may query the historical corpus 222 for additional information stored therein and find associated physical boundaries for the current user location based on the network 250.

Embodiments of the three-dimensional model generated by the boundary creation module 213, describing the physical space of the active area, may be further processed to recognize a subset of the actual physical space containing identified objects and boundaries classified by the CNN image classifier. Embodiments of three-dimensional PS1 model being further processed may include labels describing context within the physical space. For example, labelling portions of the physical space as "U" for unfilled or "F" for filled sections. Unfilled portions can include empty sections of the physical space, or empty space on top of existing objects (i.e., an empty counter or tabletop). Portions of the physical space labelled as "filled" may include positions within the physical area where physical objects reside such as furniture or walls that a user cannot move into or interact with in a physical manner due to the established boundary.

Embodiments of the virtualized location module 209 may comprise an asset module 215a, 215b (referred to generally herein as asset module 215). Asset module 215 may perform one or more tasks, functions and/or processes associated with analyzing location data of the locations selected using the location selection engine 211, extracting of the virtual assets 225 associated with the selected location and classification of the extracted virtual assets 225. In the exemplary embodiment of FIG. 2 and FIG. 3, the asset module 215 can extract virtual assets 225 from one or more location data source(s) 227 depicting the location selected by the location selection engine 211 using one or more virtual assets 225.

Location data source(s) 227 may be any place available via network 250 where data or physical information about the selected location is obtained and digitized. Location data source(s) 227 may be any type of data, in any file format, so long as the asset module 215 understands the file format. Location data source(s) 227 may contain libraries of existing three-dimensional computer-generated assets readily available for use by the virtualized location module 209 in some embodiments. For example, three-dimensional models of objects found within the selected location and/or structural components that may define the selected location. In other embodiments, the location data source(s) 227 may comprise data describing the selected location, upon which three-dimensional models or other virtual assets can be computer-generated by the virtualized location module 209. For example, images or videos depicting a layout of the selected location, including one or more objects visible within the selected location, blueprints or floor plans of the selected locations and/or features thereof. Virtual assets 225 extracted from one or more location data source(s) 227 can be stored in an asset repository 223, allowing for re-use of the virtual assets 225 of the same location at a later point in time by the user. During subsequent uses of the same selected location, virtual assets 225 that were previously extracted and stored by the asset repository 223 may not need to be re-extracted from the location data source(s) 227, unless the asset module 215 is seeking to check for updated assets associated with the selected location.

Embodiments of the virtual assets 225 stored by asset repository 223 can be imported into the asset module 215 for further analysis and processing by the asset module 215. Embodiments of the asset module 215 may classify the virtual assets 225 of the selected location. For example, in the exemplary embodiment, virtual assets 225 may be classified into assets that depicts objects, features or areas of the selected location that someone would spend a significant amount of time viewing within a real or virtual environment. These assets that attract a significant level of user attention may be referred to as point-of-interest (POI) assets. A "significant level" of interest in particular objects or features of the real or virtual environment may vary depending on the environments being selected or the user. In some embodiments, a threshold level of engagement with the object or features of the real or virtual environment may determine whether a virtual asset 225 is a POI asset, wherein if a level of engagement by individuals or users is above the set threshold level, the virtual asset 225 is considered a POI asset. Examples of POI assets that may be the objects or features that people visiting a location may focus their attention on can include landmark locations, memorials, art exhibits within an art gallery, fossils or educational material positioned within a museum, animals within a zoo, vehicles within a car dealership, etc. Likewise, the remaining virtual assets 225 that may not be the focus of individuals or users visiting the real environment being virtualized or the virtualized model thereof, may be referred to as filler assets. Filler assets may be computer-generated versions of objects or features that may reside within the space of the real world, historical or fictitious location that is being virtualized, but may not garner much attention of a user or individual to reach a threshold level of attention. Filler assets may instead provide surrounding context to the virtual environments. For example, within an art gallery, the paintings may be the POI assets, while other surrounding objects such as walls, furniture, plants or other non-focal decor, lighting fixtures, or other objects that are typically ignored, may be classified as filler.

Exemplary embodiments of the asset module 215 may analyze and classify virtual assets 225 as POI assets or filler assets using historical data collected and stored by the historical corpus 222. Embodiments of the historical corpus 222 may learn and draw conclusions about asset classifications based on data collected describing interactions between users interacting with the virtual assets 225 in a virtualized environment or based on data describing how individuals interact with the real-world object being represented by the virtual asset 225. For instance, data may be crowd sourced from a plurality of users that may use or access the virtualized location module 209 and incorporate a particular virtual asset 225 into a virtualized environment. Historical corpus 222 may collect the information about how users are interacting with the virtual asset 225 when a user creates a virtual environment that comprises the virtual asset 225 being tracked. Historical corpus 222 may share the interaction data across the entire community of users that use the virtualized location module 209. For example, data collected by the historical corpus 222 describing user interactions with a virtual asset 225 incorporated into a virtual environment suggesting that users spend 80% of the user's time looking at paintings within a selected location, then objects identified by the CNN image classifier as paintings and modeled as virtual assets 225 may be classified as POI assets.

In some embodiments of the asset module 215, virtual assets 225 being used by the virtualized location module 209 to create a virtualized environment may be tagged manually by users or automatically by the asset module 215. When manual tagging is utilized, users setting up the selected location being mapped and rendered may manually identify using an interface, which virtual assets 225 to include in the rendering of the physical location and may further assign classifications to the virtual assets 225 selected, such as defining the asset as a POI asset or a filler asset. In some embodiments, where automated tagging is performed, user behavior may be tracked to assign classifications to the virtual assets. For example, imaging devices 205 and/or sensor devices 207 may track user attention, head position and eye movements, to ascertain a percentage of a user's time spent focusing on virtual assets 225. Virtual assets that receive the most attention and focus from a user may be automatically tagged as POI assets, whereas surrounding assets that receive the least amount of attention from the user may be automatically tagged as filler assets by the asset module 215. Tags assigned to the virtual assets 225, whether assigned manually or automatically, may be stored to the historical corpus 222 and may be remembered the next time a user creates a virtual environment using the previously tagged virtual asset 225.

Embodiments of a mapping module 217a, 217b (referred to herein generally as mapping module 217) may perform one or more functions, tasks or processes associated with mapping virtual assets 225 of the selected location to positions within the active area established by the physical boundaries created using the boundary creation module 213 and optimizing the layout mapped to the virtual environment using a combination of POI assets and/or filler assets overlaid onto the active area. Embodiments of the virtual environment may be mapped manually by a user, automatically using machine learning techniques, or using a combination of manual and automatic mapping. In an embodiment that utilizes manual mapping, the mapping module 217 may receive one or more inputs from users selecting and assigning positions to POI assets within the active area of the virtual environment. In embodiments utilizing an automated mapping technique that takes advantage of machine learning to identify the placement of virtual assets 225 within the virtual environment, the mapping module 217 may query and receive input from the historical corpus 222. The historical corpus 222 may analyze where the same or similarly classified objects being represented as virtual assets 225 are historically located and mapped within the selected location and based on historical patterns for placing the classified objects within the physical environment and/or virtual environment, the mapping module 217 may automatically map the virtual asset 225 within the same or similar position, consistent with the patterns of historical mapping placement.

In the exemplary embodiment of the mapping module 217, the mapping module 217 may manually or automatically append to a three-dimensional model of the physical space comprising the active area selected by the user, positional markers identifying points of placement for virtual assets 225 within the virtual environment. This second three-dimensional model of the physical space (referred to herein as the "PS2 model") is similar to the three-dimensional model previously described above as PS1 model, except the PS2 model identifies points where virtual assets 225 are mapped, rather than filled or unfilled portions of the physical space defining the active area. Rather than the "U" and "F" markers of the PS1 model, embodiments of the PS2 model may be marked with interest markers ("I") and non-interest interest markers ("N"). Each of the I markers may designate a position within the active area of the virtual environment for placement of a POI asset, whereas N markers may designate positions within the virtual environment for the placement of filler assets. These markers, denoting placement of the various classifications of virtual assets 225 may be manually selected by users or automatically selected using machine learning techniques and historical data of the historical corpus 222.

Embodiments of the mapping module 217 may construct and optimize a completed third three-dimensional model of the physical space (referred to as a "PS3 model") for rendering and displaying the virtual assets 225 within the virtual environments. To generate the PS3 model, the mapping module 217 may use a combination of a generative adversarial network 229 (hereafter GAN 229) along with the data and marker positions placed in the PS2 and PS1 models described above. Embodiments of GAN 229 may construct the optimized PS3 model representing an overlay of the physical space of the active area designated by the boundary creation module 213 with the points of interest (i.e., points of the PS2 map designated with an "I" marker) designated for placement of POI assets. Likewise, non-interesting objects (i.e., filler assets) designated using N markers in the PS2 model, such as columns, blank walls, and other filler assets mentioned above, etc. can be segmented from the PS2 model and applied to positions designated as "F" spaces in the PS1 model, wherein a user cannot occupy within the physical space of the active area. Embodiments of GAN 229 may self-contextualize the unfilled spaces as noted by the PS1 model with virtual assets 225 to generate the three-dimensional mapping of the PS3 model that is fully contextualized with the selected location and aligned with the user's points of interest or the points of interests. Embodiments of mapping module 217 may dynamically adjust the size, shape and distances between objects represented as virtual assets 225 mapped to the physical space of the active area.

In some embodiments, the mapping module 217 may iterate through a plurality of potential mapping layouts of the virtual assets 225 being positioned within the physical space confining the active area of the virtual environment. The plurality of layouts outputted by the mapping module 217 may be ranked and scored in order to find the optimal layout in view of the characteristics and features of the physical space defining the virtual environment. For example, each PS3 model comprising a mapping layout outputted by the mapping module 217 can be assigned an optimization score. The optimization score can be calculated and assigned based on one or more parameters defining the virtual environment, such as the number of virtual assets 225 placed within the virtual environment, the balance between POI assets and filler assets, ease of navigating or accessing POI assets within the virtual environment, the quality of the output from GAN 229, etc. For each iteration cycle, the generated layouts for the virtual environment can be compared based on assigned weights for each parameter and the layout with the highest optimization score can be rendered and displayed to the user. Weightings of each parameter that contribute to the optimization score may be trained based on user preferences. For example, if a user is known to prefer real or virtual environments that are less cluttered with objects, parameters associated with the virtual asset spacing, density, orientation and positioning between virtual assets may be given more weight that parameters associated with GAN output quality.

In some embodiments, users may provide feedback to the mapping layouts of the virtual environments being displayed by the AR device 201 or VR device 203. In some embodiments wherein the displayed virtual environment is not to the user's taste, the user may provide negative feedback, and in response to the negative feedback, the iteration of the mapped layout being displayed may be replaced with the layout having the next highest optimization score. In other instances, upon receiving negative feedback from a user, the mapping of the virtual environment may be reset and the mapping module 217 may start over and attempt to create an entirely new set of mapping layouts of virtual assets 225 within the virtual environment.

Figure 6B:
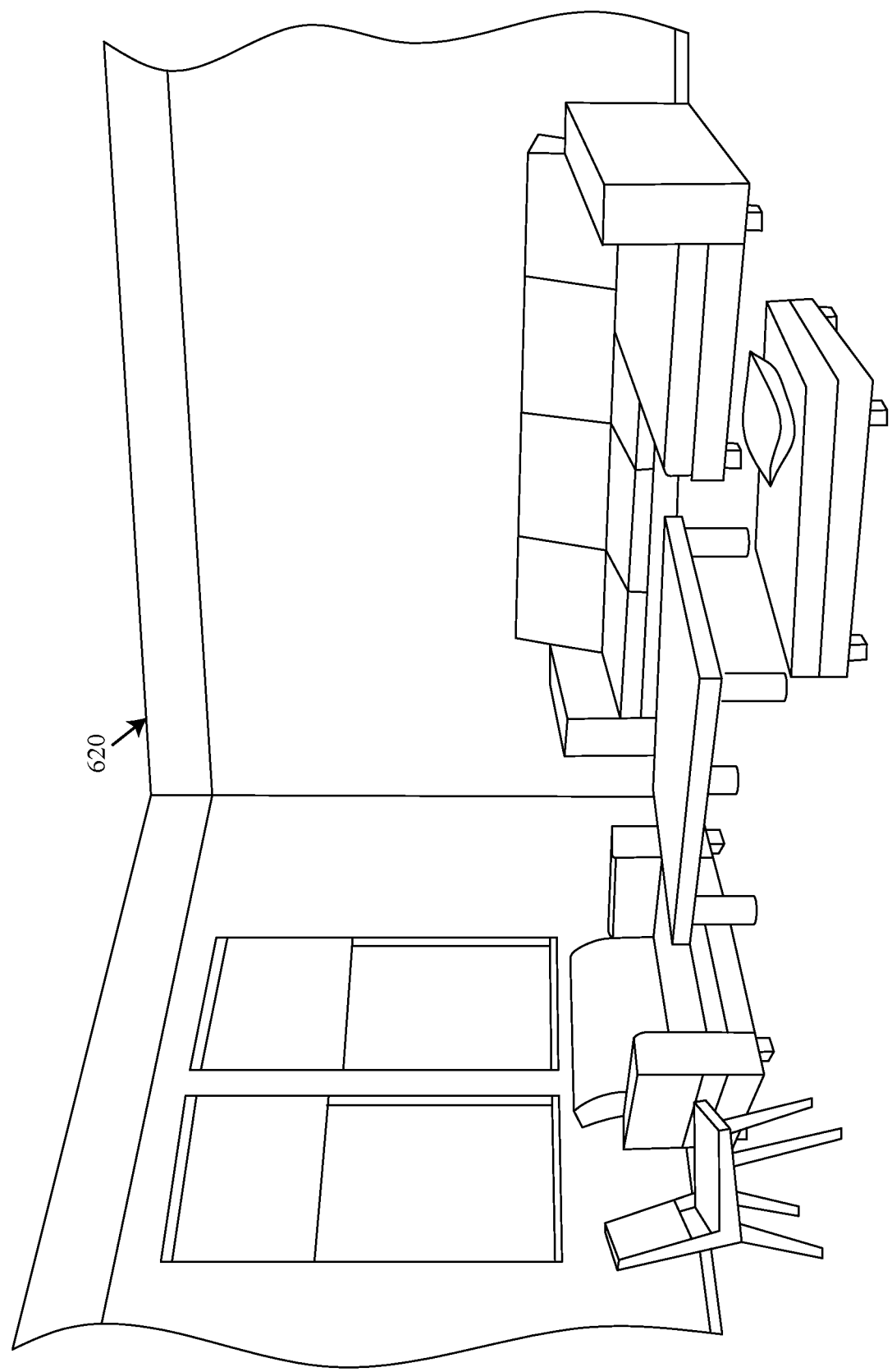
FIG. 6B illustrates an embodiment of physical location selected for remapping and experiencing an augmented reality or virtual reality environment depicting at least a portion of the location of FIG. 6A.
Figure 6C:
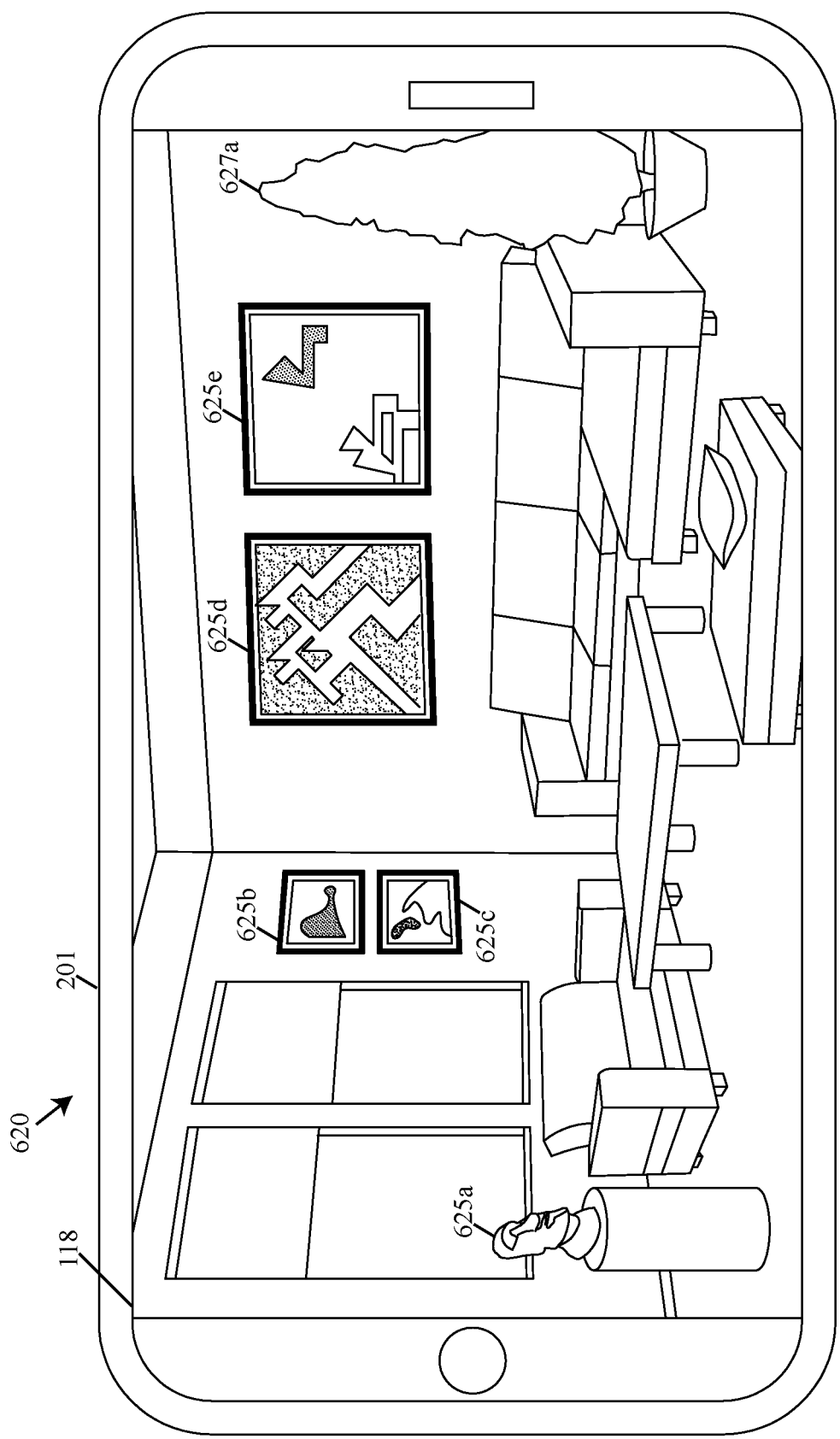
FIG. 6C illustrates an embodiment of a virtual environment viewed through an AR device mapping, rendering and overlaying the virtual environment onto the physical location of FIG. 6B using augmented reality.

FIGS. 6B and 6C provide an exemplary embodiment of mapping a layout of a virtual environment remapping one or more objects of 601*a*-601*f,* 603*a*-603*b* of a selected location 600 as virtual assets 225 overlaid onto and displayed within a physical location 620 using an AR device 201. As depicted in FIG. 6B, the location 600 is devoid of the objects, such as the artwork and statue from location 600, as represented by objects 601*a*-601*f* or one or more filler objects 603*a*-603*b*. In FIG. 6C, the virtual environment overlaid onto physical location 620 may be viewed using an AR device 201. By scanning physical location 620, one or more virtual assets 225 depicting digitized objects of location 600 can be viewed using the AR device 201 within the physical location 620. For example, the virtual assets 225 depicting paintings 625*b*-625*e* found within the real-world location of the selected location 600 are mapped along the walls of the physical location 620 as one or more POI assets along with a statue 625*a* positioned in an empty space beside a chair existing within physical location 620. Moreover, as shown in the Example of FIG. 6C, filler assets can also be mapped and inserted into the virtual environment. For instance, in the virtual environment mapped to physical location 620, a virtual asset 225 depicting plant 603*b* found within location 600 is positioned as digital plant 627*a* in an open space beside a sofa within physical location 620 as a filler asset.

In some circumstances, embodiments of the mapping module 217 may recognize that the physical space defining the active area of the virtual environment may be segmented into sections in order to better fit the plurality of virtual assets 225 within the physical space and/or the amount of virtual assets 225 mapped to the physical space may be considered too numerous for a single segment of the physical space to contain. Instead of rendering and displaying the entire mapping of the virtual environment altogether, embodiments of the mapping module 217 may segment the virtual environment into separately displayable sections, separated by real or virtual doors and/or barriers that a user may interact with to load the next section of the virtual environment. For example, a user residing within a first portion of a virtual environment being rendered and displayed, may view a first set of virtual assets mapped to the first portion of the virtual environment. A real door, or a virtual door comprised of a virtual asset 225 depicting a door within the virtual environment, may separate the first portion of the virtual environment, from an unloaded second portion of the virtual environment. While the user is experiencing the first portion of the virtual environment, the user's action may instruct the virtualized location module 209 to load the second or subsequent section of the virtual environment. For instance, opening a real door positioned within the physical space or virtual door rendered at a threshold point, may cause a new portion of the virtual environment to be rendered and displayed by an AR device 201 or VR device 203, including a second set of virtual assets positioned within the second portion of the virtual environment.

Segmentation of a virtual environment into a plurality of separate sections using doors or other barriers as segmentation points may be introduced by the mapping module 217 during the mapping process described above. Determining whether to segment a virtual environment into separately loaded sections may occur automatically based on one or more conditions or triggers in some instances. For example, a simple trigger mechanism may be used to identify whether an existing door in physical space, or virtual door in virtual space, should act as a gateway or portal to a new section of the virtual environment when a number of virtual assets 225 or objects mapped to the virtual environment is above or below a particular threshold or percentage. In this example, if the number of virtual assets 225 mapped to the virtual environment is above or below a selected threshold, the mechanism for segmenting the virtual environment into multiple sections may be triggered and segmentation points of the virtual environment are added to the model of the physical space, indicating that the door or barrier separates the sections of the virtual environment being loaded into two separate batches for loading.

Another example of a trigger mechanism may be based on the square footage of the physical space comprising the active area and/or a ratio of square footage to the number of virtual assets. If the square footage of entire physical space is above a particular threshold or the ratio of the number of virtual assets being rendered is above a threshold ratio compared with the size of the physical space, the mechanism to segment portions of the virtual environment due to the overall size or strain placed on the AR or VR device may be triggered. By triggering a mechanism for segmenting the virtual environment into smaller sections to be rendered and displayed separately, the segmentation may improve the virtual experience, make the viewing experience in AR or VR smoother and decrease the processing requirements on the AR device 201 or VR device 203. In other instances, segmenting the virtual environment may be introduced manually by a user designing the mappings of the virtual environment. Users may map segmentation points to existing doors physically present within a physical space, such as doors or thresholds separating two different rooms being integrated into the virtual environment, or virtual doors and virtual barriers may be rendered and displayed when viewing the virtual environment through the AR or VR devices to show the segmentation points while experiencing the virtual environment being displayed.

In some embodiments, a single door or barrier being used as segmentation points may separate a plurality of sections of the virtual environment. Embodiments of the real or virtual doors or barriers can be further programmed with logic or triggering actions that may indicate to the virtualized location module 209 which portion of the virtual environment to render and display on the other side of the door or barrier. For example, the way a user opens door, for instance, using left hand or a right hand may load different environments and virtual assets 225 on the other side of the door or barrier, once the door or barrier is opened. For instance, opening a virtual door with the user's left hand may render and display a first section of the virtual environment comprising a first set of virtual assets, whereas opening the virtual door with the right hand may render and display a second section of the virtual environment comprising a second set of virtual assets on the other side of the virtual door.

In some embodiments, a virtualized keypad, or other type of virtualized input device may allow a user to select the next section of the virtualized environment to render and display from a plurality of available sections of the virtualized environment. For example, a virtual keypad on the virtual door may allow for a multi-digit code to be entered, with each code corresponding to a different section of the virtual environment. A user may input the code on the virtual keypad corresponding to the section of the virtualized environment the user wants to render and display once the virtual door is open. When the user opens the door, the virtualized location module 209 renders and displays the section of the virtual environment corresponding to the inputted code. In an alternative embodiment, the instead of a door with a keypad, a virtual elevator could be created. As the user enters the virtual elevator, the user may select a button inside, wherein each button may correspond to a different section of the virtual environment that may be loaded. Upon selecting a button, virtual doors may close, and the virtual doors may reopen, displaying the next segment of the virtual environment selected by the user.

Figure 7A:
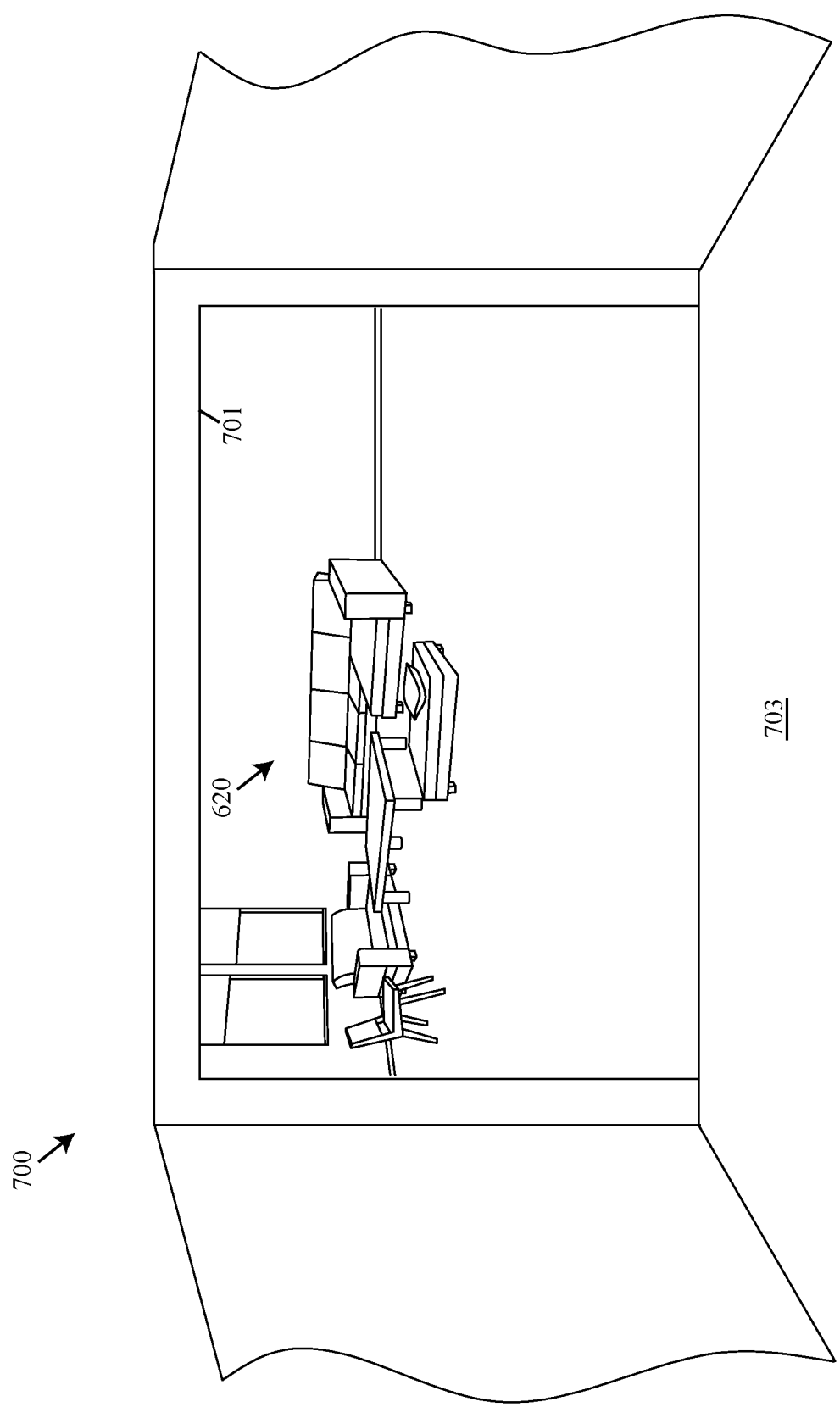
FIG. 7A illustrates an embodiment of a physical location available for experiencing a virtual environment using an AR device or VR device, the physical location comprising a first section and a second section.
Figure 7B:
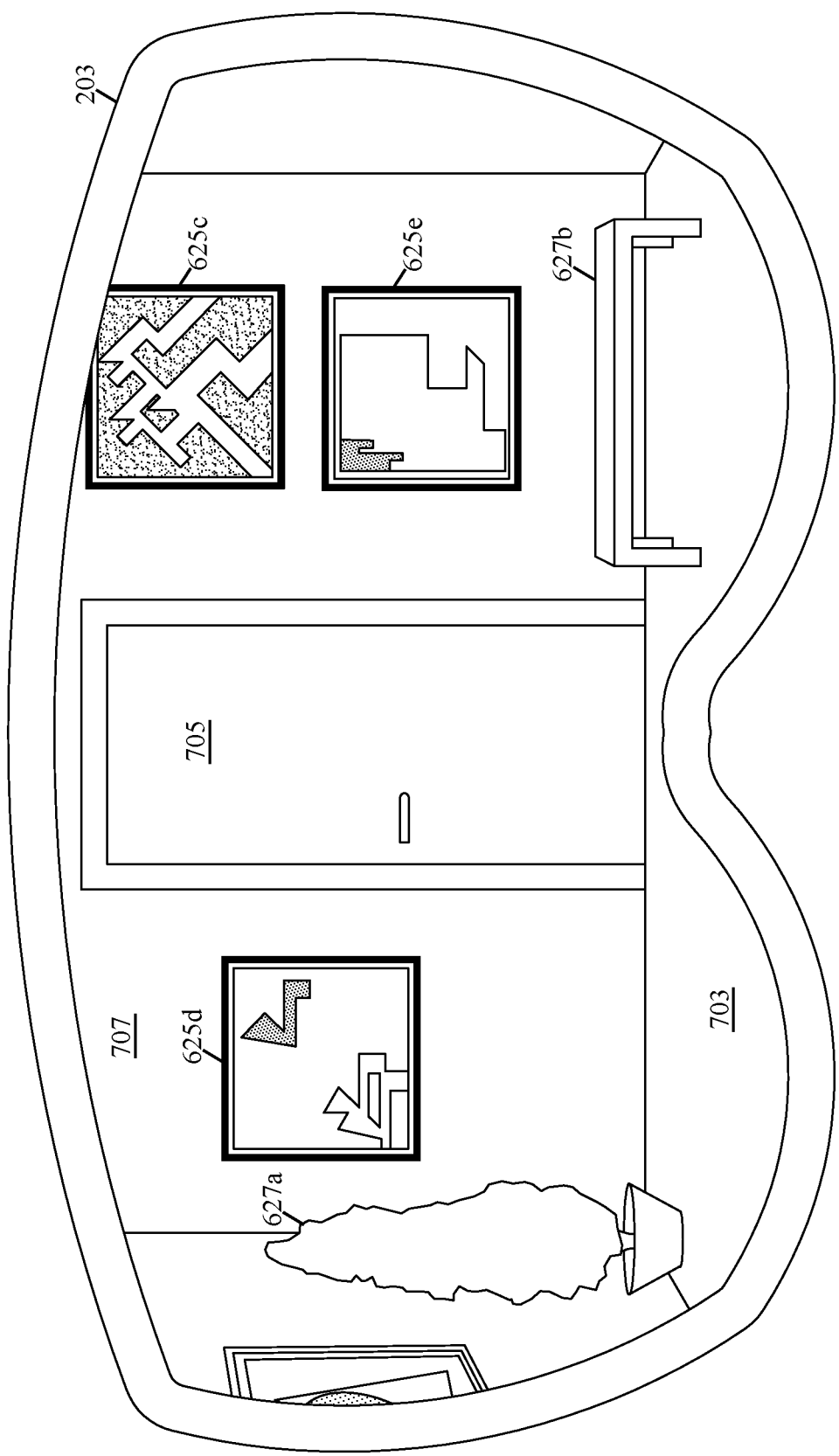
FIG. 7B illustrates an embodiment of a virtual environment viewed through a VR device within the physical location of FIG. 7A, said virtual environment separating the first section from the second section of the physical location by a door or barrier.
Figure 7C:
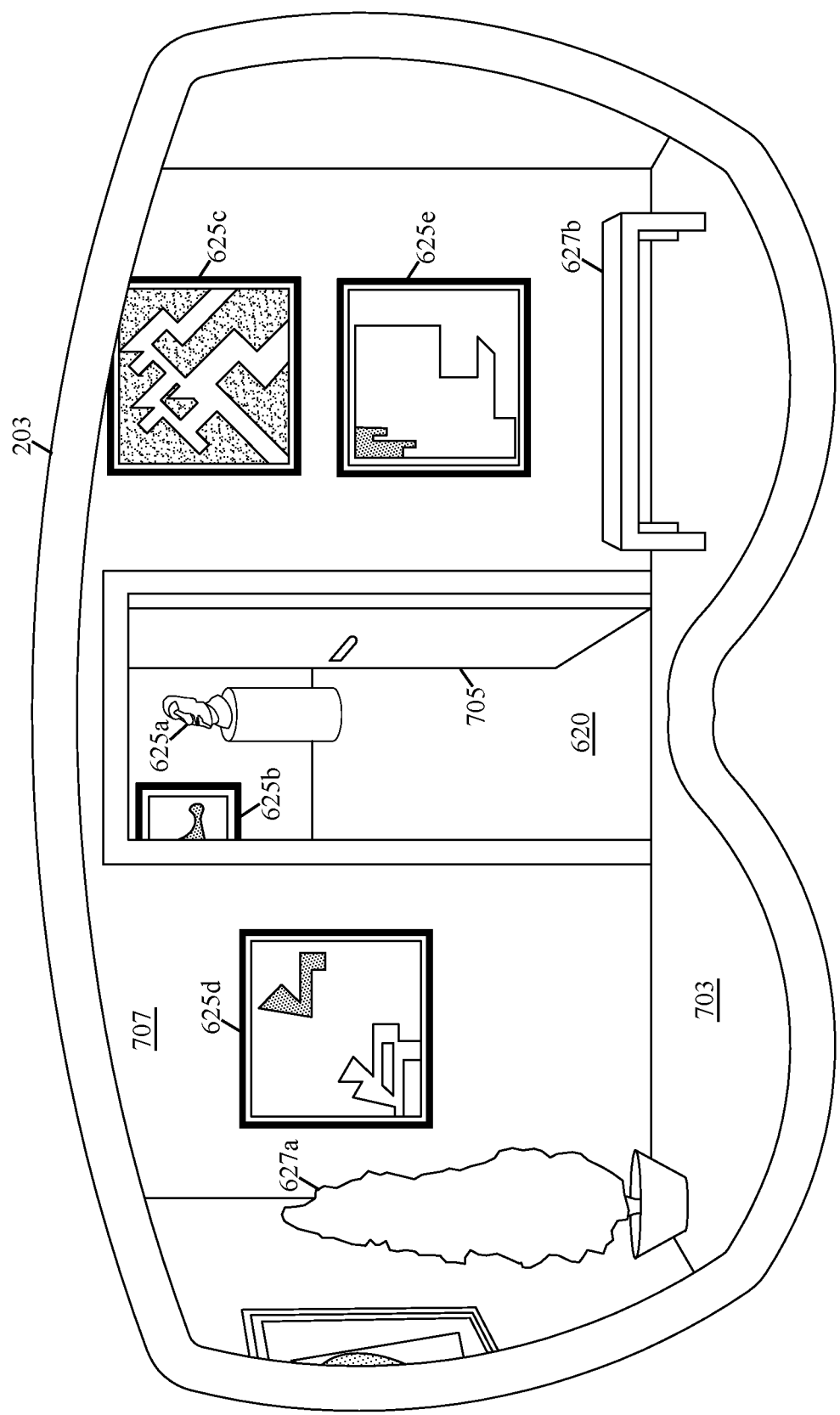
FIG. 7C illustrates an embodiment of a virtual environment viewed through a VR device rendering and displaying the second section of the virtual environment via interacting with the door or barrier.

FIGS. 7A-7C depicts an example of segmenting an active area of a virtual environment into a plurality of sections that may be rendered, loaded and displayed as each section is accessed, instead of entirely at once. As shown in FIG. 7A, the active area of a physical location 700 comprises at least two separate interconnected locations separated by a threshold or segmentation point 701. In this particular example, the segmentation point is an archway between two separate rooms in a home. But in other embodiments, the segmentation point may be also physically separated; for example, by a door or barricade. The first physical location 703 is separated by a second physical location 620. As shown in FIG. 7B, upon viewing the virtual environment via VR device 203, a user positioned within the first physical location 703 may observe a virtual wall 707 and virtual door 705 obscuring the user's view into additional sections of the virtual environment being displayed. Virtual wall 707 and virtual door 705 may be positioned relative to the position of the segmentation point 701 between the first physical location 703 and second physical location 620. While the user is positioned within the first physical location 703, the user is able to view the digital representations of paintings 625*c*-625*e* of physical location 600 being mapped to the virtual environment, as well as additional representations of filler objects from the physical location 600, including plant 627*a* and bench 627*b*. As shown in the example of FIG. 7C, the segment of the virtual environment mapped to the second physical location 620 may be loaded, rendered and displayed by capturing an action by the user, such as opening the door 705, revealing a continuation of the virtual environment beyond the door 705. In this example, the virtual assets 225 of statue 625*a* and painting 625*b* can be loaded and observed beyond door 705 within the second section of the virtual environment.

Embodiments of the virtualized location module 209 may further comprise a rendering engine 219*a*, 219*b* (referred generally herein as rendering engine 219) and a display module 221*a*, 221*b* (referred to herein, generally, as display module 221). Rendering engine 219 performs the tasks, functions and processes associated with generating photorealistic images from 2D and 3D models from the PS3 model, to create the virtual environment comprising geometry, viewpoint, texture, physics, lighting and shading information in conjunction with the virtual assets 225 mapped thereto. In some embodiments, the rendering engine 219 may give the three-dimensional models animations during rendering. Display module 221 may display the virtual environments rendered by the rendering engine 219 via a display device of the AR device 201 and/or VR device 203, allowing for the user to view, move, interact and experience the virtual environments using the AR device 201 or the VR device 203.

Figure 3:
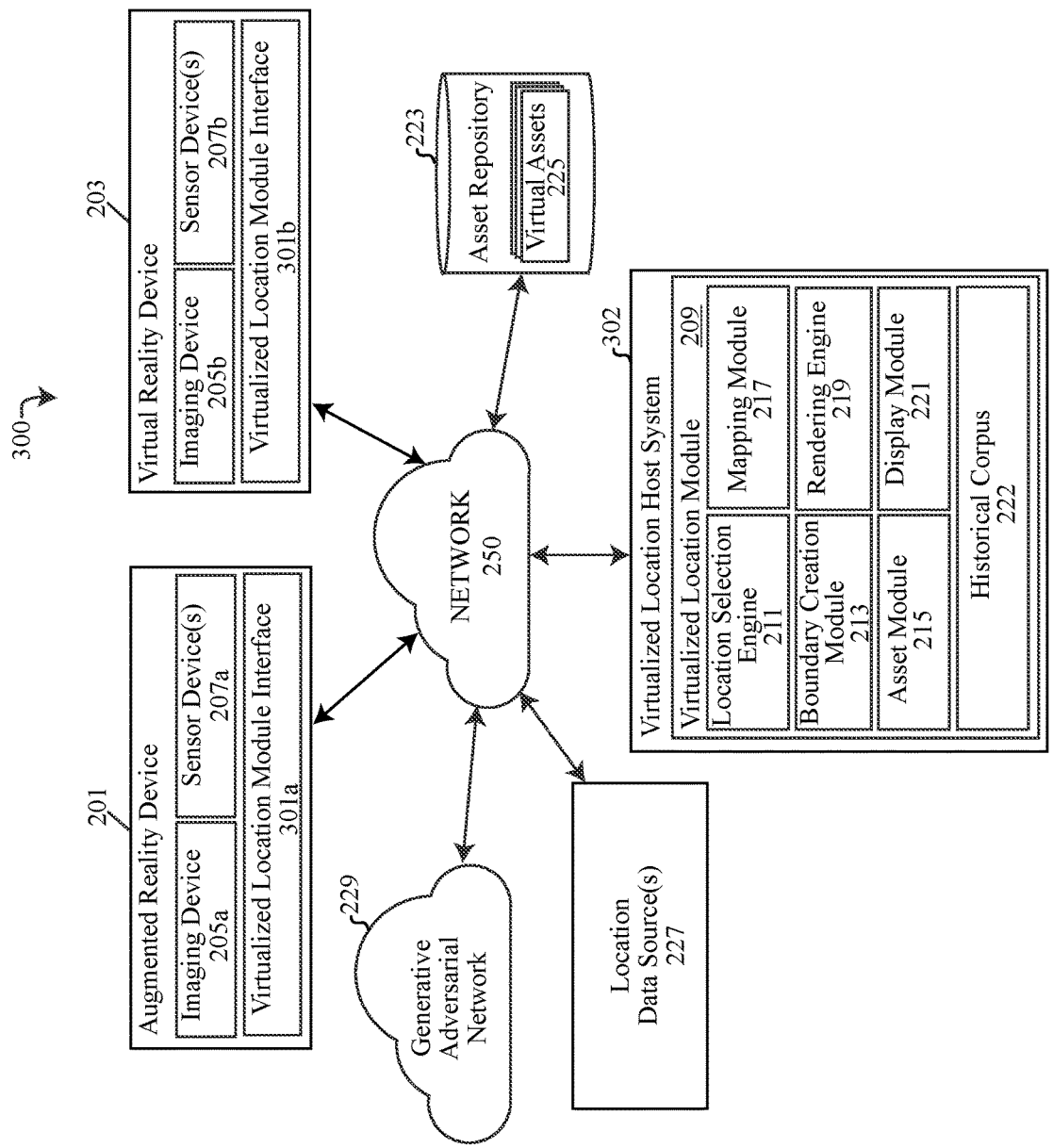
FIG. 3 depicts a functional block diagram describing an alternate embodiment of a computing environment for mapping and displaying a virtual environment within the boundaries of a physical location in accordance with the present disclosure.

FIG. 3 of the drawings depicts a computing environment 300 illustrating an alternative embodiment that differs from the computing environment 200 of FIG. 2. As shown in FIG. 3, a virtualized location host system 302 connected to network 250 hosts the virtualized location module 209; for example, as a service or remotely accessible application. The arrangement of computing environment 300 differs from computing environment 200, wherein, instead of the virtualized location module 209 being maintained locally stored and accessed by the AR device 201 or VR device 203, the AR and VR devices may remotely access the virtualized location module's 209 functions and features via network 250 by accessing the virtualized location module 209 remotely using a virtualized location module interface 301*a*, 301*b* as shown in FIG. 3.

Method for Mapping and Displaying Virtual Environments

Figure 8A:
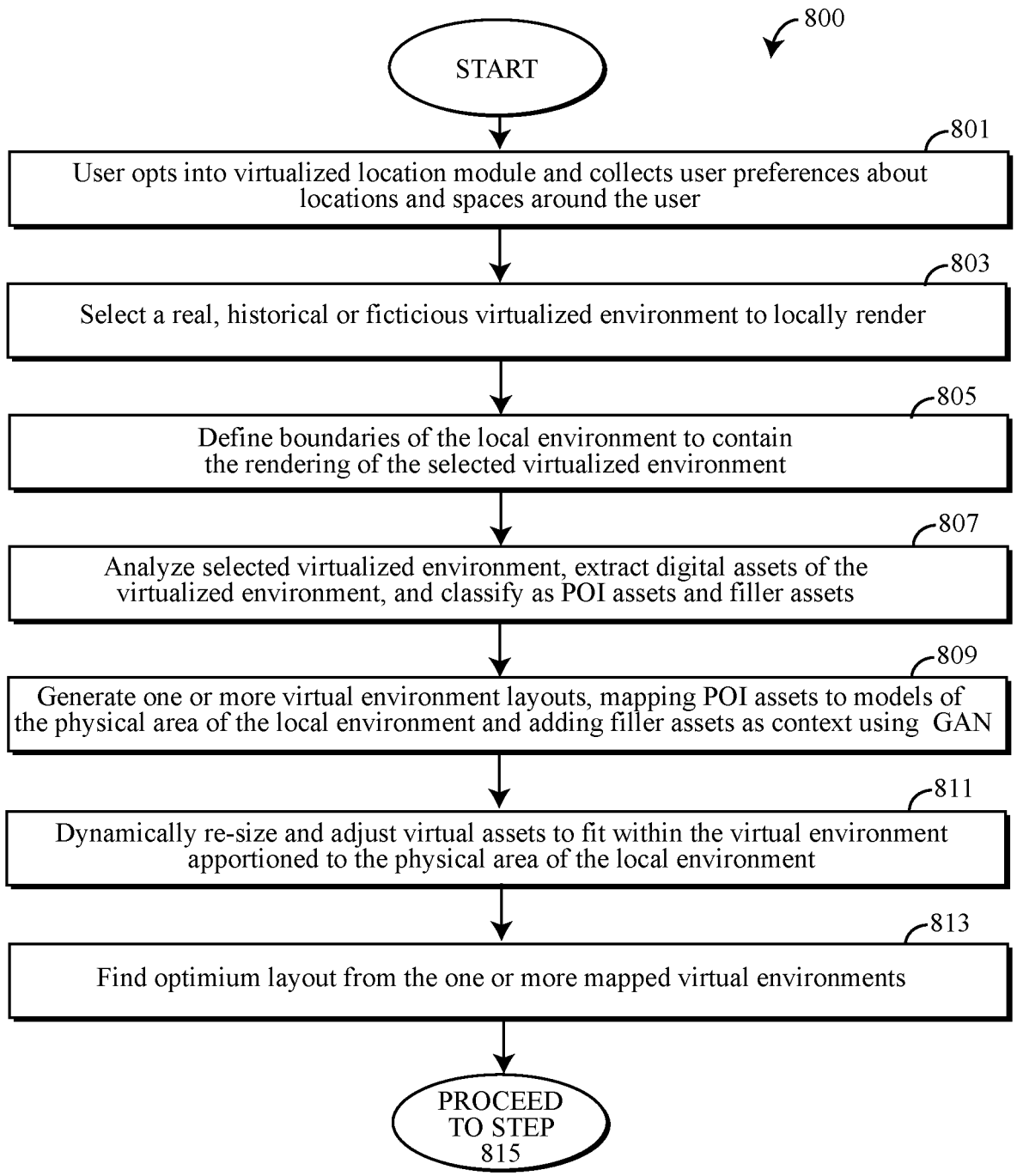
FIG. 8A depicts a flow diagram describing an embodiment of a method for mapping and displaying a virtual environment within the boundaries of a physical location.
Figure 8B:
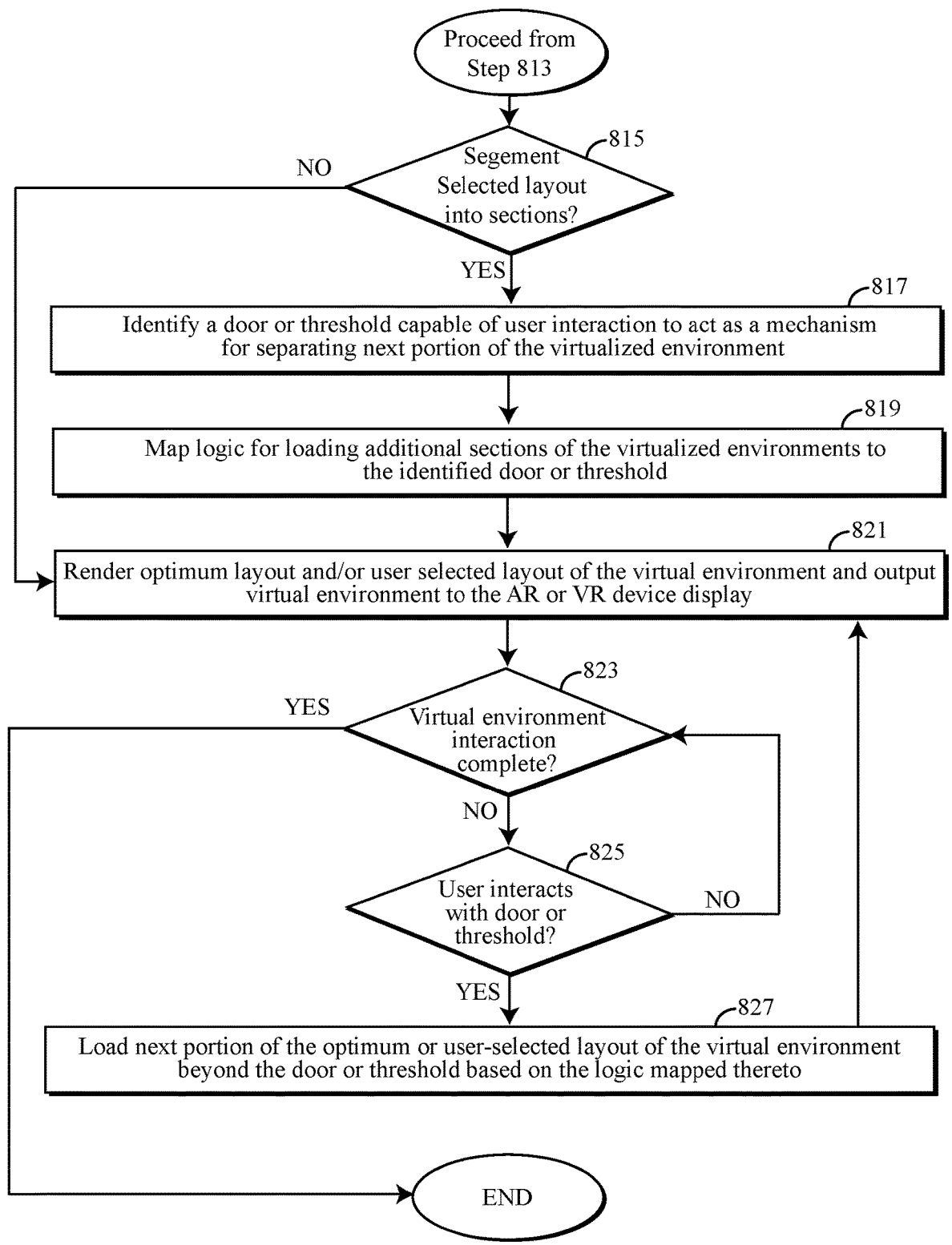
FIG. 8B depicts a continuation of the flow diagram of FIG. 8A describing a continuation of the embodiment of the method for mapping and displaying a virtual environment within the boundaries of a physical location.

The drawings of FIGS. 8A-8B represent embodiments of a method for mapping, rendering and displaying real or fictitious locations and/or digital assets thereof, as part of a virtual environment, optimized based on the characteristics of physical space available for the virtual environment within a computing environment 200, 300, 400, as described in accordance with FIGS. 2-7C above, using one or more computing systems defined generically by computing system 100 of FIG. 1; and more specifically by the embodiments of specialized computer systems depicted in FIGS. 2-7C and as described herein. A person skilled in the art should recognize that the steps of the method described in FIGS. 8A-8B, may be performed in a different order than presented and may not require all the steps described herein to be performed. Rather, some embodiments may alter the methods by using one or more of the steps discussed below.

The embodiment of the method 800 may begin at step 801. During step 801, a user may opt into the and access the virtualized location module 209 and provide permissions to collect and store data and/or preferences about the user in the historical corpus 222. In some embodiments, the user may further grant permission to the virtualized location module 209 to access imaging data and sensor data by the imaging device 205 and sensor device 207, respectively. By being granted permission by the user to collect data, the historical corpus 222 of the virtualized location module 209 may create a user profile comprising one or more records describing various user preferences, user behaviors or track user interactions with the real physical spaces the user visits and/or a user's patterns of interacting with objects in the real physical spaces the user visits.

At step 803, users interacting with the virtualized location module 209 may select the type of virtual environment the user would like to locally render and/or display by the AR device 201 or VR device 203 using the location selection engine 211. The virtual environments selected for mapping and rendering may be based on real locations in the physical world, historical locations from a particular point in time and even fictitious locations that may have be entirely unique, existed only in works of fiction or may be an amalgamation of real and fictitious locations. For example, the selected environment may be a generic area created from a template or a dynamic locale that may be based on a type of location; for instance, non-real museum that contains collections of artworks from museums around the world. The selected virtual environment may be a real location that a user has previously visited, has interacted with and/or the historical corpus 222 has collected data regarding the user's visit and interaction with the real location in the real world.

At step 805 of algorithm 800, the boundary creation module 213 may define the physical boundaries of the local environment functions as the active area for the user to experience the rendered and displayed content of the virtualized environment. A user can define the physical boundaries of the active area by walking along the perimeter of the physical area being established to contain the virtual environment, including defining the physical boundaries of one or more rooms, walls, doors, thresholds, accessible areas, etc. Boundaries may be automatically identified and recommended using a CNN image classifier analyzing images and data captured by imaging device 205, and portions of the physical area may be classified. In some instances, previously collected geo-location and network access data may be used to recall physical locations that have been previously mapped for use as the active area within which a user has experienced a virtual environment. In some instances, the boundaries for previously established physical locations may be loaded into the boundary creation module 213 and re-used again.

At step 807, asset module 215 may analyze the environment selected to be the basis for the virtual environment, extract virtual assets 225 from location data sources 227 describing or depicting the selected environment. The asset module 215 may further classify the virtual assets 225 being extracted from the one or more data sources and classify the extracted virtual assets 225. For example, based on the level of attention and interaction the objects represented by the virtual assets 225 may be known to receive. Objects that are represented by virtual assets 225 that are known to receive a level of attention and/or interaction above a specific threshold may be classified as POI assets, whereas objects with recorded levels of interaction and attention from users below the threshold may be classified as filler assets. Moreover, in some embodiments, users creating the virtual environment may select classifications of the virtual assets 225 and/or override classifications assigned by the asset module 215, by manually tagging objects and virtual assets 225 for mapping to the virtual environment as POI assets of filler assets.

At step 809, mapping module 217 generate models mapping one or more layouts of the virtual environment with virtual assets. Embodiments of the mapping module 217 may generate the layouts for the virtual environment by mapping POI assets to models of the physical area local environment confined by the physical boundaries defined in step 805. For example, using historical context provided by the historical corpus 222 and input from the user selecting positions within the virtual environment to insert one or more POI assets. GAN 229 may fill remaining portions of the of the models of the virtual environment with filler assets, providing additional context to the surrounding virtual environment. In step 811, embodiments of the mapping module 217 may dynamically resize and adjust the virtual assets 225 from the asset's original size that was extracted, in order to fit the virtual asset being mapped to the virtual environment such that the virtual asset will be properly proportioned to fit any size constraints of the active area defined by the physical boundaries.

At step 813 of algorithm 800, the mapping module 217 may find the optimum layout for the virtual environment from the one or more layouts generated in step 809. Mapping module 217 may iterate through each of the potential layouts to find the optimal layout before rendering and displaying the optimal mapped layout via the AR device 201 or VR device 203. In exemplary embodiments, layouts can be scored using an optimization score taking into consideration one or more weighted parameters and preferences of the user. The mapped layouts may be ranked according to optimization scores, and the mapped layout generated by the mapping module with the highest optimization score may be selected for rendering and display.

At step 815, a determination may be made by the mapping module 217 whether the selected layout that was generated with the highest optimization score should be segmented into multiple sections. For example, because the layout of the virtual environment mapped by the mapping module 217 is larger than any single section of the active area established by the physical boundaries of the local environment, the selected layout activates a trigger mechanism for segmenting the layout into separate sections loaded separately by the AR or VR device, the mapping of the virtual environment may place excess processing strain on the AR or VR device if the layout was loaded all at once, and/or the user has manually inserted segmentation points for dividing the virtual environment into separate sections that can be loaded separately from one another. If, the determination is made in step 815 that the layout mapped by the mapping module 217 should not be segmented, the algorithm 800 may proceed to step 821. Conversely, where segmentation of the mapping layout into separately rendered and/or displayed sections of the virtual environment is determined by the mapping module 217, the algorithm 800 may proceed to step 817. At 817, the mapping module 217 identifies a physical door or threshold present within the local environment and/or a position for placing a virtual door or barrier to act as a mechanism for separating the portions of the virtualized environment. Mapping module 217 may update the models for the virtual environment to include the real or virtual doors as a segmentation point for loading different sections of the virtual environment. Furthermore, where multiple sections of the virtual environment are mapped to a single door, barrier or object, in step 819, the mapping module may map additional logic for determining which section of the virtualized environment to load based upon the user's interaction with the door, barrier or object.

In step 821, the rendering engine 219 may render the model of the optimum layout of the virtual environment into a three-dimensional environment capable of being displayed in augmented reality or virtual reality by an AR or VR device. The rendering of the virtual environment is outputted to a display device of AR device 201 and/or VR device 203, whereby as user may view, experience and/or interact with the virtual environment being displayed. In step 823 of algorithm 800, a determination may be made whether or not the user's interaction with the virtual environment is complete. If the user has completed interacting with the virtual environment, the algorithm may be completed and end. Likewise, where the user continues to interact with the virtual environment being displayed, the algorithm may proceed to step 825.

In step 825 of algorithm 800, a determination may be made whether the user is interacting with a door, threshold, barrier, or other object within the virtual environment that is mapped to a segmentation point for separating sections of the virtual environment. If the user is not interaction with a portion of the virtual environment that constitutes a segmentation point, the algorithm may proceed back to step 823. Conversely, where the user does interact with a portion of the virtual environment that segments the virtual environment into one or more separate sections, the algorithm 800 may proceed to step 827. In step 827, the user's interaction with the segmentation point of the virtual environment may determine which portion of the virtual environment is loaded next, in accordance with the logic programmed into the door, barrier, threshold, or other object. Upon interaction with the segmentation point, the virtualized location module 209 may load the next portion of the virtual environment beyond the door, threshold or barrier, in accordance with the programmed logic mapped onto the door, threshold, barrier, or object triggering the next portion of the virtual environment to be rendered and/or loaded and displayed by the AR device 201 or VR device 203.

What is claimed is:

1. A computer-implemented method for displaying a computer-generated virtual environment comprising:
   selecting, by a processor, a virtual space from a selection of real, historical or fictitious locations;
   defining, by the processor, physical boundaries of an active area in real world space configured to contain the computer-generated virtual environment;
   extracting, by the processor, virtual assets depicting the virtual space from one or more data sources;
   classifying, by the processor, the virtual assets into point of interest (POI) assets and filler assets;
   mapping, by the processor, the POI assets to the computer-generated virtual environment, within the physical boundaries of the active area, wherein placement of the POI assets within the active area are optimized based on size constraints imposed by the physical boundaries and characteristics of the active area; and
   further mapping, by the processor, a remaining portion of the active area using a generative adversarial network (GAN) configured to map the remaining portion of the active area with the filler assets based on relative distance between the POI assets mapped within the active area of the virtual space.

2. The computer-implemented method of claim 1, wherein defining the physical boundaries of the active area containing the computer-generated virtual environment further comprises:
   capturing, by the processor, images from imaging device, said images comprising the physical boundaries and one or more real world objects positioned within the active area;
   inputting, by the processor, the images into a convolutional neural network (CNN) image classifier, wherein said image classifier identifies the physical boundaries of the active area and classifies types of objects positioned within the active area; and
   receiving, by the processor, output from the CNN image classifier comprising one or more physical boundary recommendations for establishing the active area.

3. The computer-implemented method of claim 1, further comprising:
   collecting, by the processor, preferences from a user describing real, physical spaces visited by the user, the user's previous activity defining the physical boundaries of the active area, and data describing historical interactivity between one or more objects within the real, physical spaces visited by the user, and the user; and
   storing, by the processor, the preferences, the user's previous activity defining the physical boundaries of the active area and the data describing the historical interactivity to a historical corpus.

4. The computer-implemented method of claim 1, further comprising:
   dynamically adjusting shape and size of the virtual assets mapped to the active area to fit within the active area.

5. The computer-implemented method of claim 3, wherein defining the physical boundaries of the active area in real world space comprises:
   automatically defining the active area based on the user's previous activity defining the physical boundaries of the active area stored by the historical corpus.

6. The computer-implemented method of claim 3, wherein the classifying the virtual assets as the POI assets or the filler assets is learned from the data collected by the historical corpus describing a user interactivity with objects represented by the virtual assets within real locations being represented by the virtual space, wherein the user interactivity with POI assets are recorded above a threshold level of interactivity.

7. The computer-implemented method of claim 1, wherein the classifying of the virtual assets into the POI assets and the filler assets is performed by manually tagging the virtual assets as the POI assets or filler assets, or by collecting visual tracking data recording eye contact by people interacting with real physical objects within real locations being represented by the virtual assets in the virtual space.

8. The computer-implemented method of claim 1, further comprising:
   iterating, by the processor, through two or more potential layouts within the active area comprising a combination of POI assets and filler assets,
   calculating, by the processor, an optimization score for each of the two or more potential layouts based on a plurality of parameters having an assigned weight; and
   displaying by the processor, a layout for the active area having a highest optimization score.

9. The computer-implemented method of claim 1, further comprising:
   triggering, by the processor, a mechanism for segmenting the active area into segments of the active area, loaded in batches, wherein two or more segments of the active area are separated by a real door or a virtual door, wherein upon opening the real door or the virtual door within the active area, a new segment of the active area is rendered and displayed.

10. The computer-implemented method of claim 9, wherein the real door or the virtual door is programmed to include logic within the virtual environment, wherein one or more context-specific action cause different segments of the active area to be rendered and displayed upon opening the real door or the virtual door.

11. A computer program product for displaying a computer-generated virtual environment comprising:
one or more computer readable storage device having computer-readable program instructions stored on non-transitory computer-readable storage media of the one or more computer readable storage device, said program instructions executes a computer-implemented method comprising:
selecting, by a processor, a virtual space from a selection of real, historical or fictitious locations;
defining, by the processor, physical boundaries of an active area in real world space configured to contain the computer-generated virtual environment;
extracting, by the processor, virtual assets depicting the virtual space from one or more data sources;
classifying, by the processor, the virtual assets into point of interest (POI) assets and filler assets;
mapping, by the processor, the POI assets to the computer-generated virtual environment, within the physical boundaries of the active area, wherein placement of the POI assets within the active area are optimized based on size constraints imposed by the physical boundaries and characteristics of the active area; and
further mapping, by the processor, a remaining portion of the active area using a generative adversarial network (GAN) configured to map the remaining portion of the active area with the filler assets based on relative distance between the POI assets mapped within the active area of the virtual space.

12. The computer program product of claim 11, wherein defining the physical boundaries of the active area containing the computer-generated virtual environment further comprises:
capturing, by the processor, images from imaging device, said images comprising the physical boundaries and one or more real world objects positioned within the active area;
inputting, by the processor, the images into a convolutional neural network (CNN) image classifier, wherein said image classifier identifies the physical boundaries of the active area and classifies types of objects positioned within the active area; and
receiving, by the processor, output from the CNN image classifier comprising one or more physical boundary recommendations for establishing the active area.

13. The computer program product of claim 11, further comprising:
collecting, by the processor, preferences from a user describing real, physical spaces visited by the user, the user's previous activity defining the physical boundaries of the active area, and data describing historical interactivity between one or more objects within the real, physical spaces visited by the user, and the user; and
storing, by the processor, the preferences, the user's previous activity defining the physical boundaries of the active area and the data describing the historical interactivity to a historical corpus.

14. The computer program product of claim 11, further comprising:
dynamically adjusting shape and size of the virtual assets mapped to the active area to fit within the active area.

15. The computer program product of claim 13 wherein defining the physical boundaries of an active area in real world space comprises:
automatically defining the active area based on the user's previous activity defining the physical boundaries of the active area stored by the historical corpus.

16. The computer program product of claim 13, wherein the classifying the virtual assets as the POI assets or the filler assets is learned from the data collected by the historical corpus describing a user interactivity with objects represented by the virtual assets within real locations being represented by the virtual space, wherein the user interactivity with POI assets are recorded above a threshold level of interactivity.

17. The computer program product of claim 11, wherein the classifying of the virtual assets into the POI assets and the filler assets is performed by manually tagging the virtual assets as the POI assets or filler assets, or by collecting visual tracking data recording eye contact by people interacting with real physical objects within real locations being represented by the virtual assets in the virtual space.

18. The computer program product of claim 11, further mapping comprising:
iterating, by the processor, through two or more potential layouts within the active area comprising a combination of POI assets and filler assets;
calculating, by the processor, an optimization score for each of the two or more potential layouts based on a plurality of parameters having an assigned weight; and
displaying by the processor, a layout for the active area having a highest optimization score.

19. The computer program product of claim 11, further comprising: triggering, by the processor, a mechanism for segmenting the active area into segments of the active area, loaded in batches, wherein two or more segments of the active area are separated by a real door or a virtual door, wherein upon opening the real door or the virtual door within the active area, a new segment of the active area is rendered and displayed, and the real door or the virtual door is programmed to include logic within the virtual environment, wherein one or more context-specific action cause different segments of the active area to be rendered and displayed upon opening the real door or the virtual door.

20. A computer system for displaying a computer-generated virtual environment comprising:
a processor;
an imaging device; and
a computer-readable storage media coupled to the processor, wherein the computer-readable storage media contains program instructions executing a computer-implemented method comprising the steps of:
selecting, by the processor, a virtual space from a selection of real, historical or fictitious locations;
defining, by the processor, physical boundaries of an active area in real world space configured to contain the computer-generated virtual environment;
extracting, by the processor, virtual assets depicting the virtual space from one or more data sources;
classifying, by the processor, the virtual assets into point of interest (POI) assets and filler assets;

mapping, by the processor, the POI assets to the computer-generated virtual environment, within the physical boundaries of the active area, wherein placement of the POI assets within the active area are optimized based on size constraints imposed by the physical boundaries and characteristics of the active area; and further mapping, by the processor, a remaining portion of the active area using a generative adversarial network (GAN) configured to map the remaining portion of the active area with the filler assets based on relative distance between the POI assets mapped within the active area of the virtual space.

* * * * *